United States Patent
Taylor et al.

(10) Patent No.: US 9,100,251 B2
(45) Date of Patent: Aug. 4, 2015

(54) DATA PROCESSING APPARATUS AND METHOD FOR INTERLEAVING AND DEINTERLEAVING DATA

(71) Applicant: Sony Corporation, Tokyo (JP)

(72) Inventors: Matthew Paul Athol Taylor, Ringwood (GB); Samuel Asangbeng Atungsiri, Basingstoke (GB); John Nicholas Wilson, Hook (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/538,917

(22) Filed: Nov. 12, 2014

(65) Prior Publication Data

US 2015/0063489 A1    Mar. 5, 2015

Related U.S. Application Data

(60) Continuation of application No. 14/260,845, filed on Apr. 24, 2014, now Pat. No. 8,891,692, which is a continuation of application No. 13/725,211, filed on Dec. 21, 2012, now Pat. No. 8,737,522, which is a (Continued)

(30) Foreign Application Priority Data

| Oct. 30, 2007 | (GB) | .................................. | 0721269.9 |
| Oct. 30, 2007 | (GB) | .................................. | 0721271.5 |
| Nov. 19, 2007 | (GB) | .................................. | 0722645.9 |
| Nov. 20, 2007 | (GB) | .................................. | 0722728.3 |

(51) Int. Cl.
  *H04B 7/02*   (2006.01)
  *H04L 27/26*  (2006.01)
  (Continued)

(52) U.S. Cl.
  CPC .......... *H04L 27/2601* (2013.01); *H04L 1/0071* (2013.01); *H04L 5/0044* (2013.01);
  (Continued)

(58) Field of Classification Search
  CPC .............. H04L 5/0044; H04L 27/2626; H04L 27/2647; H04L 1/0057
  USPC .............. 375/267, 260, 230; 370/203; 455/59
  See application file for complete search history.

(56) References Cited

U.S. PATENT DOCUMENTS

| 5,799,033 A | 8/1998 | Baggen |
| 6,181,338 B1 | 1/2001 | Brodhun |

(Continued)

FOREIGN PATENT DOCUMENTS

| CN | 85 1 01066 A | 1/1987 |
| EP | 1 463 255 A1 | 9/2004 |

(Continued)

OTHER PUBLICATIONS

Dr. Jonathan DeVile, "'Reply to examination report' Letter for EP1463256", Aug. 2, 2005, 4 pages.

(Continued)

*Primary Examiner* — Juan A Torres
(74) *Attorney, Agent, or Firm* — Oblon, McClelland, Maier & Neustadt, L.L.P.

(57) ABSTRACT

A data processing apparatus is arranged to map input data symbols to be communicated onto a predetermined number of sub-carrier signals of Orthogonal Frequency Division Multiplexed OFDM symbols. The predetermined number of sub-carrier signals is determined in accordance with one of a plurality of operating modes and the input data symbols are divided into first sets of input data symbols and second sets of input data symbols.

17 Claims, 12 Drawing Sheets

Related U.S. Application Data continuation of application No. 13/344,906, filed on Jan. 6, 2012, now Pat. No. 8,374,269, which is a division of application No. 12/249,294, filed on Oct. 10, 2008, now Pat. No. 8,179,954.

(51) Int. Cl.
*H04L 5/00* (2006.01)
*H04L 1/00* (2006.01)

(52) U.S. Cl.
CPC ........ *H04L27/2626* (2013.01); *H04L 27/2647* (2013.01); *H04L 27/2649* (2013.01); *H04L 1/0057* (2013.01)

(56) References Cited

U.S. PATENT DOCUMENTS

| | | | |
|---|---|---|---|
| 6,263,082 | B1 | 7/2001 | Ishimoto et al. |
| 6,314,534 | B1 | 11/2001 | Agrawal et al. |
| 6,353,900 | B1 | 3/2002 | Sindhushayana et al. |
| 6,522,700 | B1 | 2/2003 | Zimmermann et al. |
| 6,625,234 | B1 | 9/2003 | Cui et al. |
| 6,944,120 | B2 | 9/2005 | Wu et al. |
| 7,146,573 | B2 | 12/2006 | Brown et al. |
| 7,543,197 | B2 | 6/2009 | Palanki et al. |
| 8,130,894 | B2 | 3/2012 | Peron |
| 8,155,178 | B2 | 4/2012 | Taylor et al. |
| 8,155,228 | B2 | 4/2012 | Peron |
| 8,170,090 | B2 | 5/2012 | Taylor et al. |
| 8,170,091 | B2 | 5/2012 | Taylor et al. |
| 8,170,092 | B2 | 5/2012 | Atungsiri et al. |
| 8,175,142 | B2 | 5/2012 | Atungsiri et al. |
| 8,179,954 | B2 | 5/2012 | Taylor et al. |
| 8,179,955 | B2 | 5/2012 | Taylor et al. |
| 8,199,802 | B2 | 6/2012 | Taylor et al. |
| 8,208,524 | B2 | 6/2012 | Taylor et al. |
| 8,208,525 | B2 | 6/2012 | Taylor et al. |
| 8,306,137 | B2 | 11/2012 | Atungsiri et al. |
| 8,320,484 | B2 | 11/2012 | Taylor et al. |
| 8,351,528 | B2 | 1/2013 | Taylor et al. |
| 8,351,541 | B2 | 1/2013 | Taylor et al. |
| 8,369,434 | B2 | 2/2013 | Taylor et al. |
| 8,374,269 | B2 | 2/2013 | Taylor et al. |
| 8,396,104 | B2 | 3/2013 | Taylor et al. |
| 8,406,339 | B2 | 3/2013 | Taylor et al. |
| 2002/0186797 | A1 | 12/2002 | Robinson |
| 2003/0222886 | A1 | 12/2003 | Wilson |
| 2004/0246888 | A1 | 12/2004 | Peron |
| 2005/0008084 | A1 | 1/2005 | Zhidkov |
| 2005/0114421 | A1 | 5/2005 | Gibb et al. |
| 2006/0062314 | A1 | 3/2006 | Palin et al. |
| 2006/0123323 | A1 | 6/2006 | Kim et al. |
| 2006/0140500 | A1 | 6/2006 | Ozaki |
| 2006/0256708 | A1 | 11/2006 | Wang et al. |
| 2006/0282712 | A1 | 12/2006 | Argon et al. |
| 2007/0074266 | A1 | 3/2007 | Raveendran et al. |
| 2007/0081586 | A1 | 4/2007 | Raveendran et al. |
| 2007/0081587 | A1 | 4/2007 | Raveendran et al. |
| 2007/0081588 | A1 | 4/2007 | Raveendran et al. |
| 2007/0139428 | A1 | 6/2007 | Berkeman |
| 2007/0160128 | A1 | 7/2007 | Tian et al. |
| 2007/0171280 | A1 | 7/2007 | Tian et al. |
| 2007/0171972 | A1 | 7/2007 | Tian et al. |
| 2007/0206117 | A1 | 9/2007 | Tian et al. |
| 2007/0250742 | A1 | 10/2007 | Kowalski |
| 2008/0034271 | A1 | 2/2008 | Markman et al. |
| 2008/0151101 | A1 | 6/2008 | Tian et al. |
| 2008/0317142 | A1 | 12/2008 | Wang et al. |
| 2009/0300300 | A1 | 12/2009 | Treigherman |
| 2010/0020886 | A1 | 1/2010 | Raveendran et al. |
| 2012/0250777 | A1 | 10/2012 | Peron et al. |
| 2013/0003758 | A1 | 1/2013 | Atungsiri et al. |

FOREIGN PATENT DOCUMENTS

| | | |
|---|---|---|
| EP | 1 463 256 A1 | 9/2004 |
| EP | 1 662 739 A1 | 5/2006 |
| JP | 10-207695 A | 8/1998 |
| JP | 2007-528169 A | 10/2007 |
| RU | 2 216 873 C2 | 6/1998 |
| RU | 2 292 654 C2 | 8/2005 |
| TW | 200622678 A1 | 7/2006 |
| TW | 200623652 A | 7/2006 |
| TW | 200726254 A1 | 7/2007 |
| WO | WO 2005/091509 A1 | 9/2005 |
| WO | WO 2006/069392 A1 | 6/2006 |
| WO | WO 2006/136883 A1 | 12/2006 |

OTHER PUBLICATIONS

ETSI, "Digital Video Broadcasting (DVB); Framing structure, channel coding and modulation for digital terrestrial television", ETSI EN 300 744 V1.4.1, Jan. 2001, 4 pages.

Imed Ben Dhaou et al., "Performance analysis and low power VLSI implementation of DVB-T receiver", OFDM and DVB-T presentation, Mar. 4, 1999, 3 pages.

Notice of Acceptance issued Feb. 1, 2012, in Australian Patent Application No. 2008229928.

Yossi Segal, et al., "IEEE 802.16 TG4 OFDM PHY Proposal for the 802.16b PHY Layer", IEEE 802.16 Broadband Wireless Access Working Group, URL: http://www.ieee802.org/16/tg4/contrib/802164c-01_20.pdf>, XP002510518, Mar. 4, 2001, pp. 1-53.

"Digital Video Broadcasting (DVB); Framing structure, channel coding and modulation for digital terrestrial television", ETSI EN 300 744 V1. 5.1, 11, 2004, 64 pages.

Laszlo Horvath, et al., A Novel, High-Speed, Reconfigurable Demapper-Symbol Deinterleaver Architecture for DVB-T, Circuits and Systems, ISCAS '99, XP010341250, vol. 4, May 30, 1999, pp. 382-385.

Afshari, "A Novel Symbol Interleaver Address Generation Architecture for DVB-T Modulator" International Symposium on Communications and Information Technologies, 2006, ISCIT'06, Publication Year: 2006, pp. 989-993.

Afshari, "A Novel Symbol Interleaver Address Generation Architecture for DVB-T Modulator" International Symposium on Communications and Information Technologies, 2006, ISCIT '06, Publication Year: 2006, pp. 989-993.

Office Action issued Dec. 4, 2012 in Japanese Patent Application No. 2008-280543 with English language translation.

Office Action issued Dec. 4, 2012 in Japanese Patent Application No. 2008-277500 submitting English language translation only.

Office Action issued Dec. 4, 2012 in Japanese Patent Application No. 2008-278958 with English language translation only.

Office Action issued Dec. 4, 2012 in Japanese Patent Application No. 2008-278956 with English language translation.

Laszlo Horvath, et al.,"A Novel, High-Speed, Reconfigurable Demapper-Symbol Deinterleaver Architecture for DVB-T", Circuits and Systems, ISCAS '99, XP010341250, vol. 4, May 30, 1999, pp. 382-385.

Yossi Segal, et al., "IEEE 802.16 TG4 OFDM PHY Proposal for the 802.16b PHY Layer", IEEE 802.16 Broadband Wireless Access Working Group, http://ieee802.org/16, XP002510518, Mar. 4, 2001, pp. 1-53.

Search Report issued Jun. 13, 2013 in Taiwanese Patent Application No. 097140458.

Taiwan IPO Search Report mailed Oct. 15, 2013, in Taiwan Application No. 097140953.

Taiwan IPO Search Report mailed Sep. 16, 2013, in Taiwan Application No. 097140949.

Taiwan IPO Search Report issued Oct. 18, 2013, in Taiwan Application No. 097140457.

U.S. Appl. No. 14/531,236, filed Nov. 3, 2014, Atungsiri, et al.

US 9,100,251 B2

DATA PROCESSING APPARATUS AND METHOD FOR INTERLEAVING AND DEINTERLEAVING DATA

CROSS-REFERENCE TO RELATED APPLICATION

This application is a continuation application of Ser. No. 14/260,845, filed Apr. 24, 2014, which is a continuation of Ser. No. 13/725,211, filed Dec. 21, 2012, now U.S. Pat. No. 8,737,522, which is a continuation of Ser. No. 13/344,906, filed Jan. 6, 2012, now U.S. Pat. No. 8,374,269, which is a divisional application of U.S. application Ser. No. 12/249,294, filed Oct. 10, 2008, now U.S. Pat. No. 8,179,954. The entire contents of the above-identified applications are incorporated herein by reference. The present application also claims priority to GB Applications Nos. 0721269.9, filed Oct. 30, 2007, 0721271.5, filed Oct. 30, 2007, 0722645.9, filed Nov. 19, 2007, and 0722728.3, filed Nov. 20, 2007.

FIELD OF INVENTION

The present invention relates to data processing apparatus operable to map input symbols onto sub-carrier signals of Orthogonal Frequency Division Multiplexed (OFDM) symbols.

The present invention also relates to data processing apparatus operable to map symbols received from a predetermined number of sub-carrier signals of OFDM symbols into an output symbol stream.

Embodiments of the present invention can provide an OFDM transmitter/receiver.

BACKGROUND OF THE INVENTION

The Digital Video Broadcasting-Terrestrial standard (DVB-T) utilises Orthogonal Frequency Division Multiplexing (OFDM) to communicate data representing video images and sound to receivers via a broadcast radio communications signal. There are known to be two modes for the DVB-T standard which are known as the 2 k and the 8 k mode. The 2 k mode provides 2048 sub-carriers whereas the 8 k mode provides 8192 sub-carriers. Similarly for the Digital Video Broadcasting-Handheld standard (DVB-H) a 4 k mode has been provided, in which the number of sub-carriers is 4096.

In order to improve the integrity of data communicated using DVB-T or DVB-H a symbol interleaver is provided in order to interleave input data symbols as these symbols are mapped onto the sub-carrier signals of an OFDM symbol. Such a symbol interleaver comprises an interleaver memory in combination with an address generator. The address generator generates an address for each of the input symbols, each address indicating one of the sub-carrier signals of the OFDM symbol onto which the data symbol is to be mapped. For the 2 k mode and the 8 k mode an arrangement has been disclosed in the DVB-T standard for generating the addresses for the mapping. Likewise for the 4 k mode of DVB-H standard, an arrangement for generating addresses for the mapping has been provided and an address generator for implementing this mapping is disclosed in European Patent application 04251667.4. The address generator comprises a linear feed back shift register which is operable to generate a pseudo random bit sequence and a permutation circuit. The permutation circuit permutes the order of the content of the linear feed back shift register in order to generate an address. The address provides an indication of one of the OFDM sub-carriers for carrying an input data symbol stored in the interleaver memory, in order to map the input symbols onto the sub-carrier signals of the OFDM symbol. Similarly, an address generator in the receiver is arranged to generate addresses of the interleaver memory for storing the data symbols received from the sub-carriers of OFDM symbols to read out the data symbols to form an output data stream.

In accordance with a further development of the Digital Video Broadcasting-Terrestrial broadcasting standard, known as DVB-T2, there has been proposed that further modes for communicating data be provided. A technical problem is therefore presented in providing an efficient implementation of an interleaver for each mode, which will provide a good performance whilst reducing a cost of implementation.

SUMMARY OF INVENTION

According to an aspect of the present invention there is provided a data processing apparatus is arranged to map input data symbols to be communicated onto a predetermined number of sub-carrier signals of Orthogonal Frequency Division Multiplexed OFDM symbols. The predetermined number of sub-carrier signals is determined in accordance with one of a plurality of operating modes and the input data symbols are divided into first sets of input data symbols and second sets of input data symbols. The data processing apparatus comprises an interleaver operable to perform an odd interleaving process which interleaves the first sets of input data symbols on to the sub-carrier signals of first OFDM symbols and an even interleaving process which interleaves the second sets of input data symbols on to the sub-carrier signals of second OFDM symbols. The odd interleaving process includes writing the first sets of input data symbols into an interleaver memory in accordance with a sequential order of the first sets of input data symbols, and reading out the first sets of data symbols from the interleaver memory on to the sub-carrier signals of the first OFDM symbols in a accordance with an order defined by a permutation code. The even interleaving process includes writing the second sets of input data symbols into the interleaver memory in accordance with an order defined by the permutation code, and reading out the second sets of data symbols from the interleaver memory on to the sub-carrier signals of the second OFDM symbols in accordance with a sequential order. While the input data symbols from the first set are being read from locations in the interleaver memory, input data symbols from the second set can be written to the locations just read from and when input data symbols from the second set are being read from the locations in the interleaver memory, the input data symbols from a following first set can be written to the locations just read from. Furthermore, when the modulation mode is a mode which includes half or less than half a number of sub-carrier signals than a maximum number of sub-carriers in the OFDM symbols for carrying the input data symbols in any mode, the data processing apparatus is operable to interleave the input data symbols from both first and second sets in accordance with the odd interleaving process on to the first and second OFDM symbols.

The first OFDM symbols may be odd OFDM symbols, and the second OFDM symbols may be even OFDM symbols.

In some conventional OFDM transmitters and receivers, which operate in accordance with the 2 k and 8 k modes for DVB-T and the 4 k mode for DVB-H, two symbol interleaving processes are used in the transmitter and the receiver; one for even OFMD symbols and one for odd OFMD symbols. However, analysis has shown that the interleaving schemes designed for the 2 k and 8 k symbol interleavers for DVB-T and the 4 k symbol interleaver for DVB-H work better for odd symbols than for even symbols. Embodiments of the present invention are arranged so that only the odd symbol interleaving process is used unless the transmitter/receiver is in the mode with the maximum number of sub-carriers. Therefore, when the number data symbols which can be carried by the sub-carriers of an OFDM symbol in one of the plurality of operating modes is less than half of the number of data symbols, which can be carried in an operating mode which proves the most number of data bearing sub-carrier signals per OFDM symbol, then an interleaver of the transmitter and the receiver of the OFDM symbols is arranged to interleaver the data symbols of both the first and second sets using the odd interleaving process. Since the interleaver is interleaving the data symbols of both the first and second sets of data symbols onto the OFDM symbols using the odd interleaving process, the interleaver uses different parts of the interleaver memory to write in and read out the data symbols. Thus, compared with the example in which the interleaver is using the odd interleaving process and the even interleaving process to interleave the first and second sets of data symbols onto successive first and second OFDM symbols, which utilises the available memory, the amount of memory capacity used is twice the number of data symbols which can be carried by an OFDM symbol for the odd only interleaving. This is compared with a memory requirement of one times the number of data symbols, which can be carried in an OFDM symbol in the mode with the most number of data symbols per OFDM symbol using both the odd and even interleaving processes. However, the number of sub-carriers per OFDM symbol for this maximum operating mode is twice the capacity of the next largest number of sub-carriers per OFDM symbol for any other operating mode with the next largest number of sub-carriers per OFDM symbol.

According to some examples therefore, a minimum size of the interleaver memory can be provided in accordance with the maximum number of input data symbols which can be carried on the sub-carriers of the OFDM symbols which are available to carry the input data symbols in any of the operating modes.

In some embodiments the operating mode which provides the maximum number of sub-carriers per OFDM symbol is a 32 k mode. The other modes may include one or more of 2 k, 4 k, 8 k, and 16 k modes. Thus, as will be appreciated from the above explanation, in the 32 k mode the odd and even interleaving processes are used to interleave the data symbols, so that the size of the interleaver memory can be just enough to account for 32 k data symbols. However, for the 16 k mode and any of the other modes, then the odd interleaving process only is used, so that with the 16 k mode an equivalent memory size of 32 k symbols is required, with the 4 k mode an equivalent memory size of 8 k symbols is required, and with the 2 k mode an equivalent memory size of 4 k symbols is required.

In some examples, a different permutation code is used for performing the interleaving for successive OFDM symbols. The use of different permutation codes for successive OFDM symbols can provide an advantage where the data processing apparatus is operable to interleave the input data symbols to be communicated by the sub-carriers of the OFDM symbols or received from the sub-carrier signals of each of the OFDM symbols only using the odd interleaving process. Therefore in a transmitter a data processing apparatus is operable to interleave the input data symbols onto the sub-carrier signals of the OFDM symbols by reading in the data symbols into the memory in a sequential order and reading out the data symbols from the interleaver memory in an order determined in accordance with the set of addresses generated by the address generator. In a receiver a data processing apparatus is operable to interleave the input data symbols onto the sub-carrier signals of the OFDM symbols by reading into memory the data symbols received from the sub-carriers of the OFDM symbols in an order determined in accordance with the set of addresses generated by the address generator and reading out from memory into an output data stream in a sequential order.

Various aspects and features of the present invention are defined in the appended claims. Further aspects of the present invention include a data processing apparatus and method operable to map symbols received from a predetermined number of sub-carrier signals of an Orthogonal Frequency Division Multiplexed (OFDM) symbol into an output symbol stream, as well as a transmitter and a receiver.

BRIEF DESCRIPTION OF DRAWINGS

Embodiments of the present invention will now be described by way of example only with reference to the accompanying drawings, wherein like parts are provided with corresponding reference numerals, and in which:

FIG. 6(a) is a diagram illustrating results for an interleaver using the address generator shown in FIG. 5 for even OFDM symbols and FIG. 6(b) is a diagram illustrating design simulation results for odd OFDM symbols, whereas

FIGS. 9(a) and 9(b) show plots of the distance at the interleaver output of sub-carriers that were adjacent at the interleaver input;

DESCRIPTION OF PREFERRED EMBODIMENTS

It has been proposed that the number of modes, which are available within the DVB-T2 standard should be extended to include a 1 k mode, a 16 k mode and a 32 k mode. The following description is provided to illustrate the operation of a symbol interleaver in accordance with the present technique, although it will be appreciated that the symbol interleaver can be used with other modes and other DVB standards.

Figure 1:
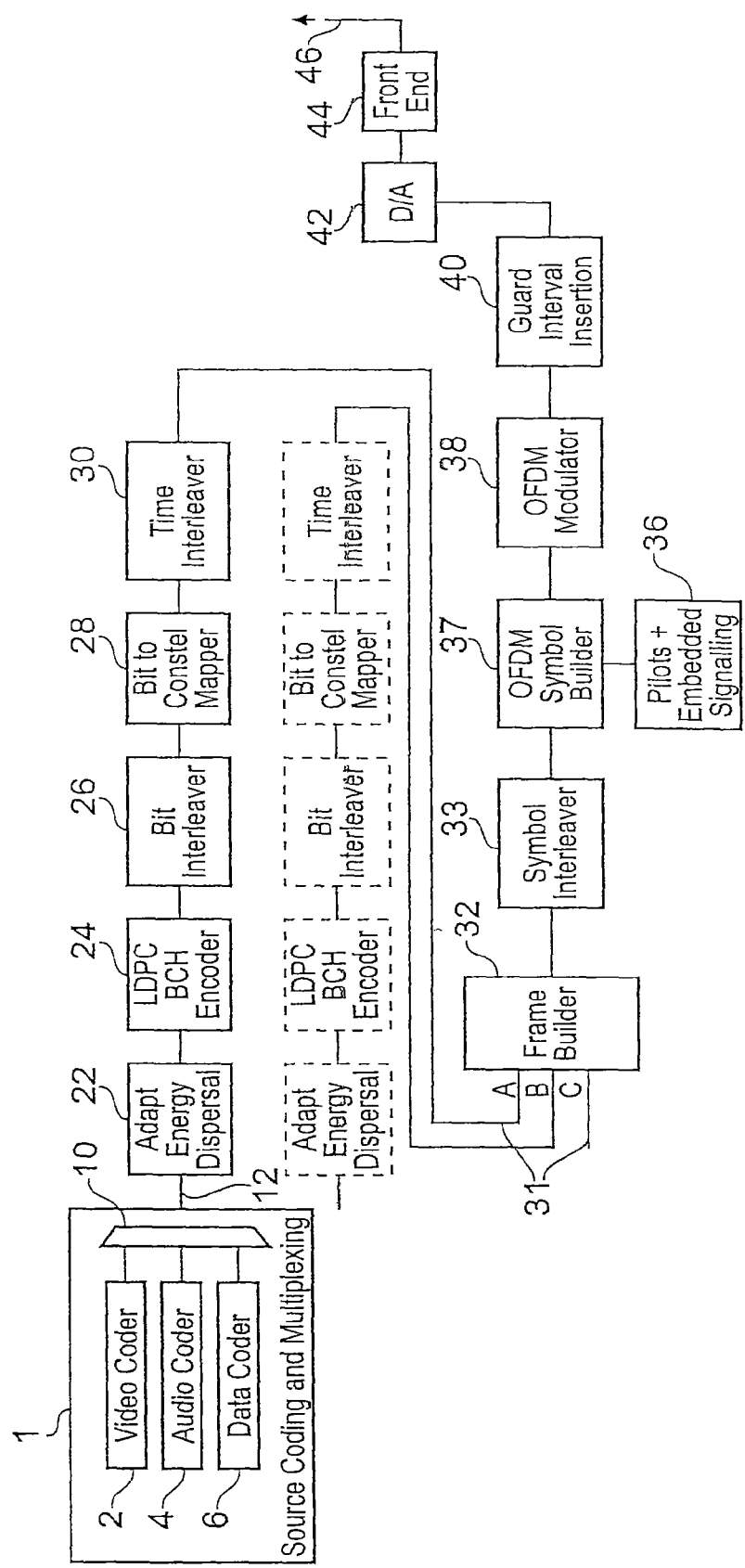
FIG. 1 is a schematic block diagram of an OFDM transmitter which may be used, for example, with the DVB-T2 standard.

FIG. 1 provides an example block diagram of a Coded OFDM transmitter which may be used for example to transmit video images and audio signals in accordance with the DVB-T2 standard. In FIG. 1 a program source 1 generates data to be transmitted by the COFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 a COFDM transmitter 20 receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point, which is to be used for conveying the encoded data bits. The outputs from the bit into constellation mapper 28 are constellation point labels that represent real and imaginary components. The constellation point labels represent data symbols formed from two or more bits depending on the modulation scheme used. These will be referred to as data cells. These data cells are passed through a time-interleaver 30 whose effect is to interleaver data cells resulting from multiple LDPC code words.

The data cells are received by a frame builder 32, with data cells produced by branch B etc in FIG. 1, via other channels 31. The frame builder 32 then forms many data cells into sequences to be conveyed on COFDM symbols, where a COFDM symbol comprises a number of data cells, each data cell being mapped onto one of the sub-carriers. The number of sub-carriers will depend on the mode of operation of the system, which may include one of 1 k, 2 k, 4 k, 8 k, 16 k or 32 k, each of which provides a different number of sub-carriers according, for example to the following table:

| Mode | Sub-carriers |
|---|---|
| 1k | 756 |
| 2k | 1512 |
| 4k | 3024 |
| 8k | 6048 |
| 16k | 12096 |
| 32k | 24192 |

Number of Sub-carriers Adapted from DVB-T/H

Thus in one example, the number of sub-carriers for the 16 k mode is twelve thousand and ninety six. For the DVB-T2 system, the number of sub-carriers per OFDM symbol can vary depending upon the number of pilot and other reserved carriers. Thus, in DVB-T2, unlike in DVB-T, the number of sub-carriers for carrying data is not fixed. Broadcasters can select one of the operating modes from 1 k, 2 k, 4 k, 8 k, 16 k, 32 k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with one or more preamble or P2 OFDM symbols, which are then followed by a number payload carrying OFDM symbols. The end of the physical layer frame is marked by a frame closing symbols. For each operating mode, the number of sub-carriers may be different for each type of symbol. Furthermore, this may vary for each according to whether bandwidth extension is selected, whether tone reservation is enabled and according to which pilot sub-carrier pattern has been selected. As such a generalisation to a specific number of sub-carriers per OFDM symbol is difficult. However, the frequency interleaver for each mode can interleave any symbol whose number of sub-carriers is smaller than or the same as the maximum available number of sub-carriers for the given mode. For example, in the 1 k mode, the interleaver would work for symbols with the number of sub-carriers being less than or equal to 1024 and for 16 k mode, with the number of sub-carriers being less than or equal to 16384.

The sequence of data cells to be carried in each COFDM symbol is then passed to the symbol interleaver 33. The COFDM symbol is then generated by a COFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between symbols, and then to a digital to analogue convertor 42 and finally to an RF amplifier within an RF frontend 44 for eventual broadcast by the COFDM transmitter from an antenna 46.

Providing a 16 k Mode

To create a new 16 k mode, for example, several elements are to be defined, one of which is the 16 k symbol interleaver 33. The bit to constellation mapper 28, symbol interleaver 33 and the frame builder 32 are shown in more detail in FIG. 2.

As explained above, the present invention provides a facility for providing a quasi-optimal mapping of the data symbols onto the OFDM sub-carrier signals. According to the example technique the symbol interleaver is provided to effect the optimal mapping of input data symbols onto COFDM sub-carrier signals in accordance with a permutation code and generator polynomial, which has been verified by simulation analysis.

Figure 2:
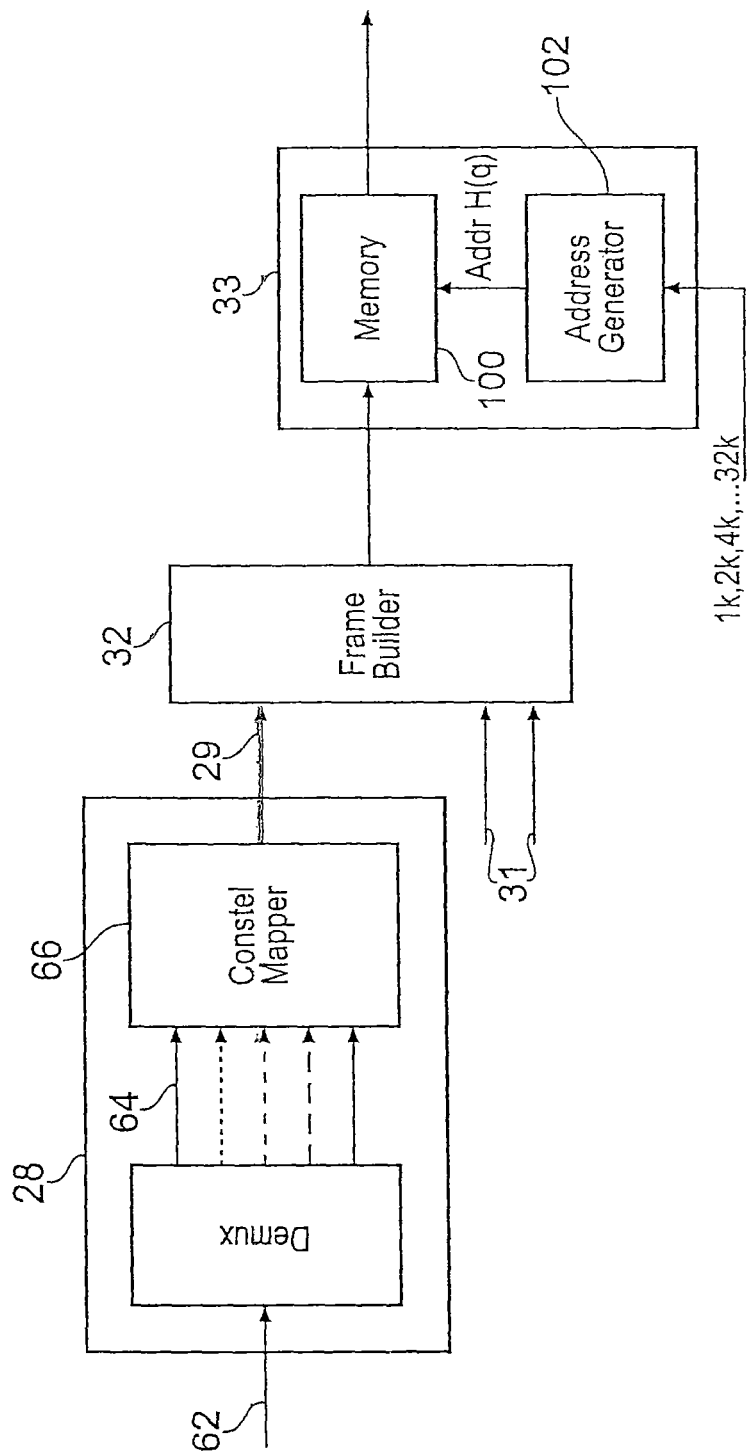
FIG. 2 is a schematic block diagram of parts of the transmitter shown in FIG. 1 in which a symbol mapper and a frame builder illustrate the operation of an interleaver.

As shown in FIG. 2 a more detailed example illustration of the bit to symbol constellation mapper 28 and the frame builder 32 is provided to illustrate an example embodiment of the present technique. Data bits received from the bit interleaver 26 via a channel 62 are grouped into sets of bits to be mapped onto a data cell, in accordance with a number of bits per symbol provided by the modulation scheme. The groups of bits, which forms a data word, are fed in parallel via data channels 64 to a mapping processor 66. The mapping processor 66 then selects one of the data symbols, in accordance with a pre-assigned mapping. The constellation point, is represented by a real and an imaginary component that is provided to the output channel 29 as one of a set of inputs to the frame builder 32.

The frame builder 32 receives the data cells from the bit to constellation mapper 28 through channel 29, together with data cells from the other channels 31. After building a frame of many COFDM cell sequences, the cells of each COFDM symbol are then written into an interleaver memory 100 and read out of the interleaver memory 100 in accordance with write addresses and read addresses generated by an address generator 102. According to the write-in and read-out order, interleaving of the data cells is achieved, by generating appropriate addresses. The operation of the address generator 102 and the interleaver memory 100 will be described in more detail shortly with reference to FIGS. 3, 4 and 5. The interleaved data cells are then combined with pilot and synchronisation symbols received from the pilot and embedded signalling former 36 into an OFDM symbol builder 37, to form the COFDM symbol, which is fed to the OFDM modulator 38 as explained above.

Interleaver

Figure 3:
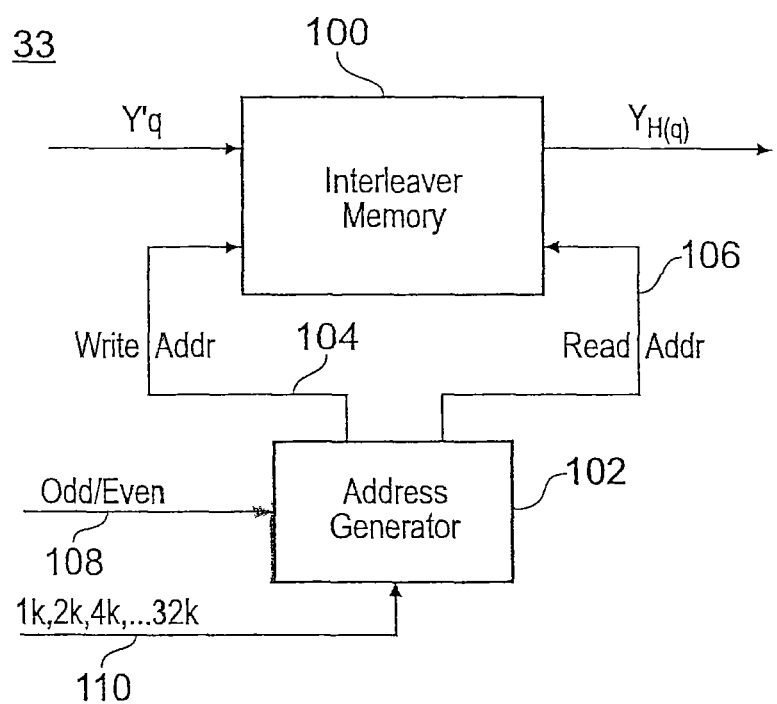
FIG. 3 is a schematic block diagram of the symbol interleaver shown in FIG. 2.

FIG. 3 provides an example of parts of the symbol interleaver 33, which illustrates the present technique for interleaving symbols. In FIG. 3 the input data cells from the frame builder 32 are written into the interleaver memory 100. The data cells are written into the interleaver memory 100 according to a write address fed from the address generator 102 on channel 104, and read out from the interleaver memory 100 according to a read address fed from the address generator 102 on a channel 106. The address generator 102 generates the write address and the read address as explained below, depending on whether the COFDM symbol is odd or even, which is identified from a signal fed from a channel 108, and depending on a selected mode, which is identified from a signal fed from a channel 110. As explained, the mode can be one of a 1 k mode, 2 k mode, 4 k mode, 8 k mode, 16 k mode or a 32 k mode. As explained below, the write address and the read address are generated differently for odd and even OFDM symbols as explained with reference to FIG. 4, which provides an example implementation of the interleaver memory 100. As will be explained, interleaving is performed differently for odd and even COFDM symbols, which are successive first and second COFDM symbols.

Figure 4:
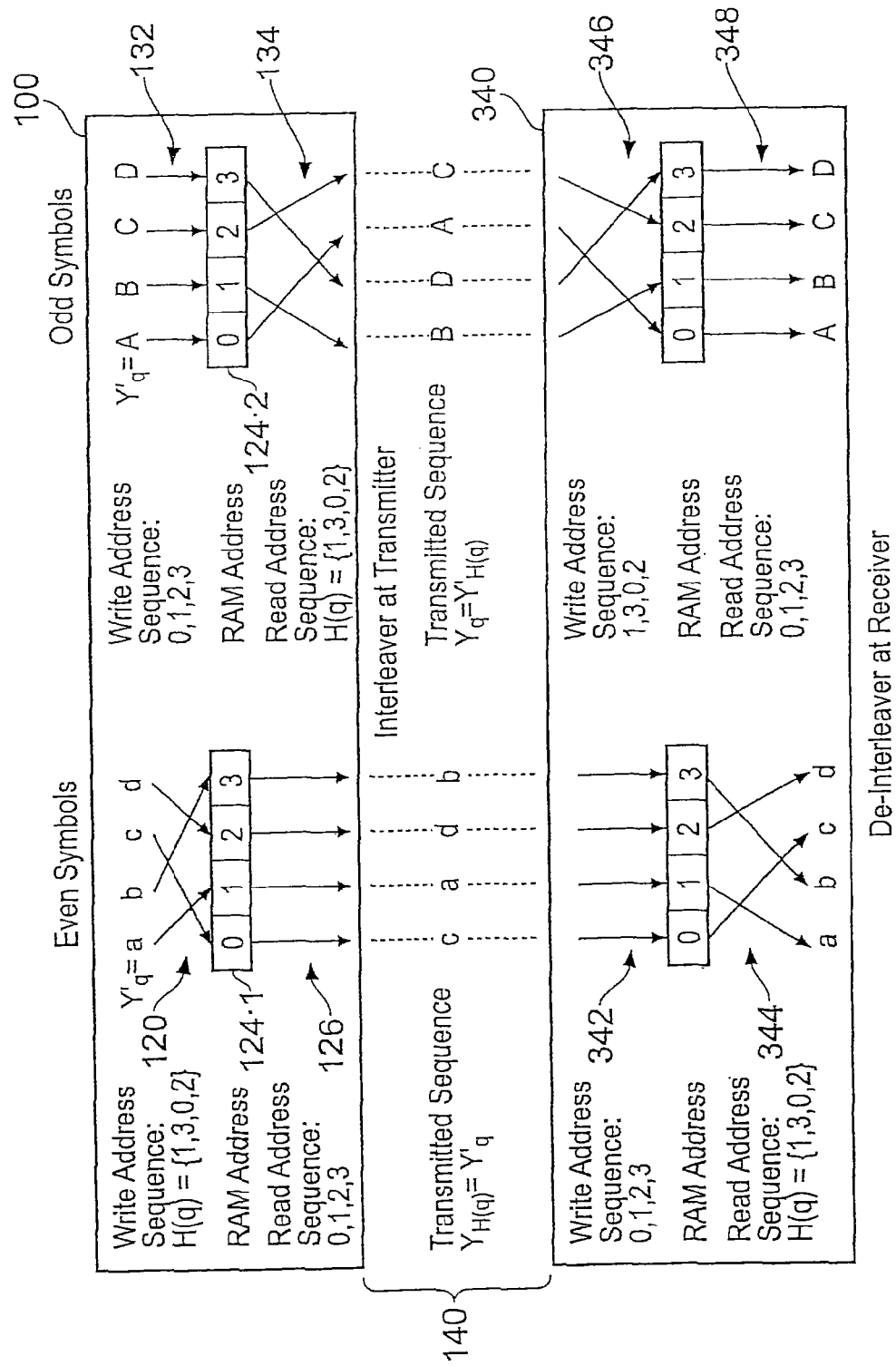
FIG. 4 is a schematic block diagram of an interleaver memory shown in FIG. 3 and the corresponding symbol de-interleaver in the receiver.

In the example shown in FIG. 4, the interleaver memory is shown to comprise an upper part 100 illustrating the operation of the interleaver memory in the transmitter and a lower part 340, which illustrates the operation of the de-interleaver memory in the receiver. The interleaver 100 and the de-interleaver 340 are shown together in FIG. 4 in order to facilitate understanding of their operation. As shown in FIG. 4 a representation of the communication between the interleaver 100 and the de-interleaver 340 via other devices and via a transmission channel has been simplified and represented as a section 140 between the interleaver 100 and the de-interleaver 340. The operation of the interleaver 100 is described in the following paragraphs:

Although FIG. 4 provides an illustration of only four input data cells onto an example of four sub-carrier signals of a COFDM symbol, it will be appreciated that the technique illustrated in FIG. 4 can be extended to a larger number of sub-carriers such as 756 for the 1 k mode 1512 for the 2 k mode, 3024 for the 4 k mode and 6048 for the 8 k mode, 12096 for the 16 k mode and 24192 for the 32 k mode.

The input and output addressing of the interleaver memory 100 shown in FIG. 4 is shown for odd and even symbols. For an even COFDM symbol the data cells are taken from the input channel 77 and written into the interleaver memory 124.1 in accordance with a sequence of addresses 120 generated for each COFDM symbol by the address generator 102. The write addresses are applied for the even symbol so that as illustrated interleaving is effected by the shuffling of the write-in addresses. Therefore, for each interleaved symbol $y(h(q))=y'(q)$.

For odd symbols the same interleaver memory 124.2 is used. However, as shown in FIG. 4 for the odd symbol the write-in order 132 is in the same address sequence used to read out the previous even symbol 126. This feature allows the odd and even symbol interleaver implementations to only use one interleaver memory 100 provided the read-out operation for a given address is performed before the write-in operation. The data cells written into the interleaver memory 124 during odd symbols are then read out in a sequence 134 generated by the address generator 102 for the next even COFDM symbol and so on. Thus only one address is generated per symbol, with the read-in and write-out for the odd/even COFDM symbol being performed contemporaneously.

In summary, as represented in FIG. 4, once the set of addresses H(q) has been calculated for all active sub-carriers, the input vector $Y'=(y_{0'}, y_{1'}, y_{2'}, \ldots Y_{Nmax-1'})$ is processed to produce the interleaved vector $Y=(y_0, y_1, y_2, \ldots y_{Nmax-1})$ defined by:

$y_{H(q)}=y'_q$ for even symbols for $q=0, \ldots, N_{max}-1$
$y_q=y'_{H(q)}$ for odd symbols for $q=0, \ldots, N_{max}-1$ In other words, for even OFDM symbols the input words are written in a permutated way into a memory and read back in a sequential way, whereas for odd symbols, they are written sequentially and read back permutated. In the above case, the permutation H(q) is defined by the following table:

TABLE 1

| \multicolumn{5}{c}{permutation for simple case where Nmax = 4} |
| --- | --- | --- | --- | --- |
| q    | 0 | 1 | 2 | 3 |
| H(q) | 1 | 3 | 0 | 2 |

As shown in FIG. 4, the de-interleaver 340 operates to reverse the interleaving applied by the interleaver 100, by applying the same set of addresses as generated by an equivalent address generator, but applying the write-in and read-out addresses in reverse. As such, for even symbols, the write-in addresses 342 are in sequential order, whereas the read out address 344 are provided by the address generator. Correspondingly, for the odd symbols, the write-in order 346 is determined from the set of addresses generated by the address generator, whereas read out 348 is in sequential order.

Address Generation for the 16 k Mode

Figure 5:
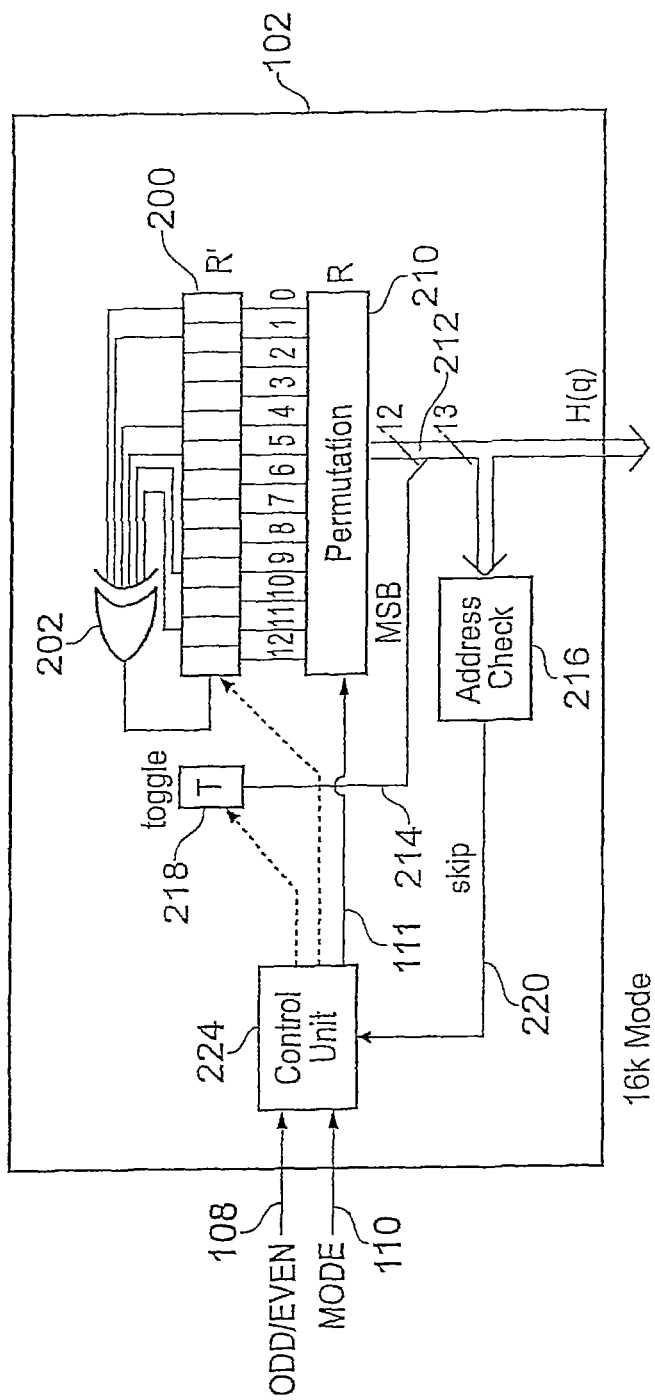
FIG. 5 is a schematic block diagram of an address generator shown in FIG. 3 for the 16 k mode.

A schematic block diagram of the algorithm used to generate the permutation function H(q) is represented in FIG. 5 for the 16 k mode.

An implementation of the address generator 102 for the 16 k mode is shown in FIG. 5. In FIG. 5 a linear feed back shift register is formed by thirteen register stages 200 and an xor-gate 202 which is connected to the stages of the shift register 200 in accordance with a generator polynomial. Therefore, in accordance with the content of the shift register 200 a next bit of the shift register is provided from the output of the xor-gate 202 by xoring the content of shift registers R[0], R[1], R[4], R[5], R[9], R[11] according to the generator polynomial:

$R_i'[12]=R_{i-1}'[0] \oplus R_{i-1}'[1] \oplus R_{i-1}'[4] \oplus R_{i-1}'[5] \oplus R_{i-1}'[9] \oplus R_{i-1}'[11]$ According to the generator polynomial a pseudo random bit sequence is generated from the content of the shift register 200. However, in order to generate an address for the 16 k mode as illustrated, a permutation circuit 210 is provided which effectively permutes the order of the bits within the shift register 200.1 from an order $R'_i[n]$ to an order $R_i[n]$ at the output of the permutation circuit 210. Thirteen bits from the output of the permutation circuit 210 are then fed on a connecting channel 212 to which is added a most significant bit via a channel 214 which is provided by a toggle circuit 218. A fourteen bit address is therefore generated on channel 212. However, in order to ensure the authenticity of an address, an address check circuit 216 analyses the generated address to determine whether it exceeds a predetermined maximum value. The predetermined maximum value may correspond to the maximum number of sub-carrier signals, which are available for data symbols within the COFDM symbol, available for the mode which is being used. However, the interleaver for the 16 k mode may also be used for other modes, so that the address generator 102 may also be used for the 2 k mode, 4 k mode, 8 k mode and 16 k mode by adjusting accordingly the number of the maximum valid address. The 16 k mode address generator could also be used for the 32 k mode, by generating a first set of addresses up to 16 k, and then generating a second set of addresses with a fixed offset to map data symbols onto the remaining carriers from a 16 k to 32 k address space.

If the generated address exceeds the predetermined maximum value then a control signal is generated by the address check unit 216 and fed via a connecting channel 220 to a control unit 224. If the generated address exceeds the predetermined maximum value then this address is rejected and a new address regenerated for the particular symbol.

For the 16 k mode, an $(N_r-1)$ bit word $R'_i$ is defined, with $N_r=\log_2 M_{max}$, where $M_{max}=16384$ using a LFSR (Linear Feedback Shift Register).

The polynomials used to generate this sequence is:

16 k mode: $R'_i[12]=R'_{i-1}[0] \oplus R'_{i-1}[1] R'_{i-1}[4] \oplus R'_{i-1}[5] \oplus R'_{i-1}[9] \oplus R'_{i-1}[11]$ where i varies from 0 to $M_{max}-1$ Once one $R'_i$ word has been generated, the $R'_i$ word goes through a permutation to produce another $(N_r-1)$ bit word called $R_i$. $R_i$ is derived from $R'_i$ by the bit permutations given as follows:

| $R'_i$ bit positions | | | | | | | | | | | | |
|---|---|---|---|---|---|---|---|---|---|---|---|---|
| 12 | 11 | 10 | 9 | 8 | 7 | 6 | 5 | 4 | 3 | 2 | 1 | 0 |
| $R_i$ bit positions | | | | | | | | | | | | |
| 8 | 4 | 3 | 2 | 0 | 11 | 1 | 5 | 12 | 10 | 6 | 7 | 9 |

Bit permutation for the 16 k mode

As an example, this means that for the mode 16 k, the bit number 12 of $R'_i$ is sent in bit position number 8 of $R_i$.

The address H(q) is then derived from $R_i$ through the following equation:

$$H(q) = (i \bmod 2) \cdot 2^{N_r-1} + \sum_{j=0}^{N_r-2} R_i(j) \cdot 2^j$$

The $(i \bmod 2) \cdot 2^{N_r-1}$ part of the above equation is represented in FIG. 5 by the toggle block T 218.

An address check is then performed on H(q) to verify that the generated address is within the range of acceptable addresses: if $(H(q)<N_{max})$, where $N_{max}=12096$ for example in the 16 k mode, then the address is valid. If the address is not valid, the control unit is informed and it will try to generate a new H(q) by incrementing the index i.

The role of the toggle block is to make sure that we do not generate an address exceeding $N_{max}$ twice in a row. In effect, if an exceeding value was generated, this means that the MSB (i.e. the toggle bit) of the address H(q) was one. So the next value generated will have a MSB set to zero, insuring to produce a valid address.

The following equations sum up the overall behaviour and help to understand the loop structure of this algorithm:

$$q = 0;$$
$$\text{for}(i = 0; i < M_{max}; i = i+1)$$
$$\left\{ H(q) = (i \bmod 2) \cdot 2^{N_r-1} + \sum_{j=0}^{N_r-2} R_i(j) \cdot 2^j; \text{if}(H(q) < N_{max}) q = q+1; \right\}$$

Analysis Supporting the Address Generator for the 16 k Mode

The selection of the polynomial generator and the permutation code explained above for the address generator 102 for the 16 k mode has been identified following simulation analysis of the relative performance of the interleaver. The relative performance of the interleaver has been evaluated using a relative ability of the interleaver to separate successive symbols or an "interleaving quality". As explained above, effectively the interleaving must be performed for both odd and even symbols, in order to use a single interleaver memory. The relative measure of the interleaver quality is determined by defining a distance D (in number of sub-carriers). A criterion C is chosen to identify a number of sub-carriers that are at distance $\leq D$ at the output of the interleaver that were at distance $\leq D$ at the input of the interleaver, the number of sub-carriers for each distance D then being weighted with respect to the relative distance. The criterion C is evaluated for both odd and even COFDM symbols. Minimising C produces a superior quality interleaver.

$$C = \sum_{1}^{d=D} N_{even}(d)/d + \sum_{1}^{d=D} N_{odd}(d)/d$$

where: $N_{even}(d)$ and $N_{odd}(d)$ are number of sub-carriers in an even and odd symbol respectively at the output of the interleaver that remain within d sub-carrier spacing of each other.

Analysis of the interleaver identified above for the 16 k mode for a value of D=5 is shown in FIG. 6(*a*) for the even COFDM symbols and in FIG. 6(*b*) for the odd COFDM symbol. According to the above analysis, the value of C for the permutation code identified above for the 16 k mode produced a value of C=22.43, that is the weighted number of sub-carriers with symbols which are separated by five or less in the output according to the above equation was 22.43.

A corresponding analysis is provided for an alternative permutation code for even COFDM symbols in FIG. 6(*c*) for odd COFDM symbols in FIG. 6(*d*). As can be seen in comparison to the results illustrated in FIGS. 6(*a*) and 6(*b*), there are more components present which represent symbols separated by small distances such as D=1, and D=2, when compared with the results shown in FIGS. 6(*a*) and 6(*b*), illustrating that the permutation code identified above for the 16 k mode symbol interleaver produces a superior quality interleaver.

Alternative Permutation Codes

The following nine alternative possible codes ([n]$R_i$ bit positions, where n=1 to 9) have been found to provide a symbol interleaver with a good quality as determined by the criterion C identified above.

| | R', bitpositions | | | | | | | | | | | | |
|---|---|---|---|---|---|---|---|---|---|---|---|---|---|
| | 12 | 11 | 10 | 9 | 8 | 7 | 6 | 5 | 4 | 3 | 2 | 1 | 0 |
| [1] $R_i$ bit positions | 7 | 12 | 5 | 8 | 9 | 1 | 2 | 3 | 4 | 10 | 6 | 11 | 0 |
| [2] $R_i$ bit positions | 8 | 5 | 4 | 9 | 2 | 3 | 0 | 1 | 6 | 11 | 7 | 12 | 10 |
| [3] $R_i$ bit positions | 7 | 5 | 6 | 9 | 11 | 2 | 3 | 0 | 8 | 4 | 1 | 12 | 10 |
| [4] $R_i$ bit positions | 11 | 5 | 10 | 4 | 2 | 1 | 0 | 7 | 12 | 8 | 9 | 6 | 3 |
| [5] $R_i$ bit positions | 3 | 9 | 4 | 10 | 0 | 6 | 1 | 5 | 8 | 11 | 7 | 2 | 12 |
| [6] $R_i$ bit positions | 4 | 6 | 3 | 2 | 0 | 7 | 1 | 5 | 8 | 10 | 12 | 9 | 11 |
| [7] $R_i$ bit positions | 10 | 4 | 3 | 2 | 1 | 8 | 0 | 6 | 7 | 9 | 11 | 5 | 12 |
| [8] $R_i$ bit positions | 10 | 4 | 11 | 3 | 7 | 1 | 5 | 0 | 2 | 12 | 8 | 6 | 9 |
| [9] $R_i$ bit positions | 2 | 4 | 11 | 9 | 0 | 10 | 1 | 7 | 8 | 6 | 12 | 3 | 5 |

Bit permutation for the 16k mode

Receiver

Figure 7:
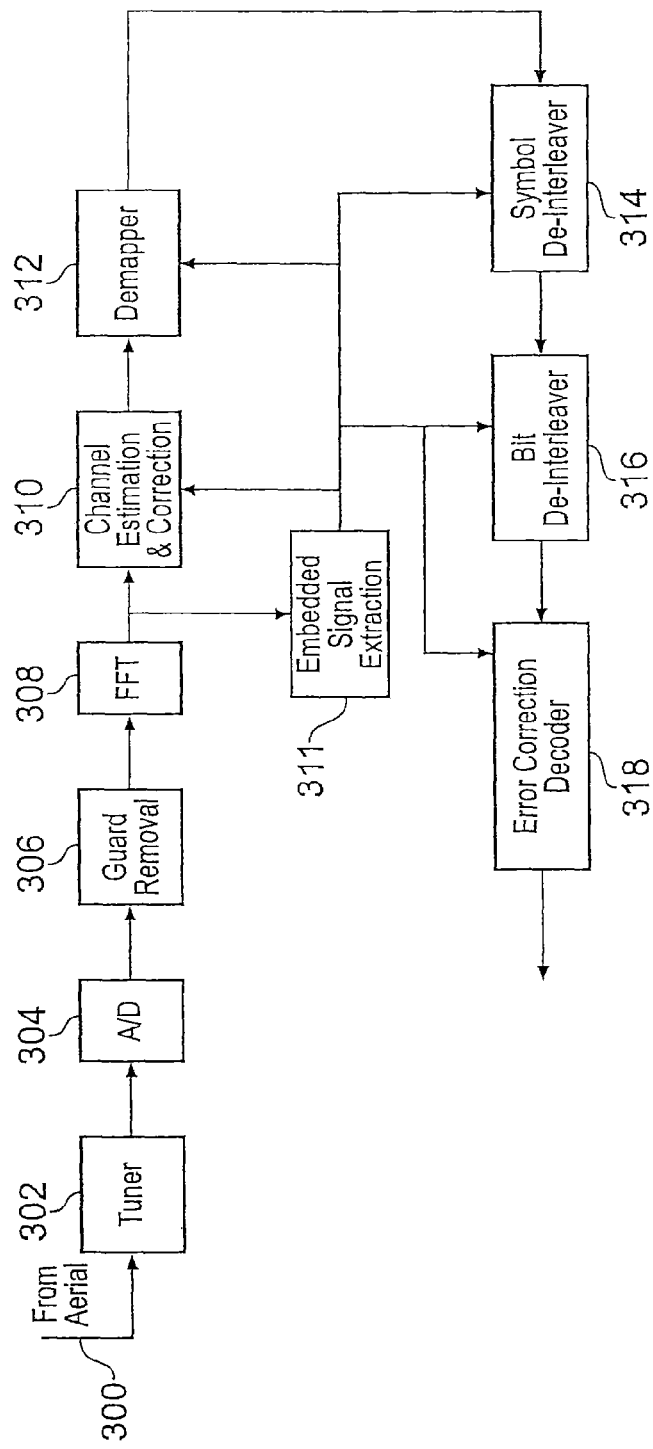
FIG. 7 is a schematic block diagram of an OFDM receiver, which may be used, for example, with the DVB-T2 standard.

FIG. 7 provides an example illustration of a receiver which may be used with the present technique. As shown in FIG. 7, a COFDM signal is received by an antenna 300 and detected by a tuner 302 and converted into a digital form by an analogue-to-digital converter 304. A guard interval removal processor 306 removes the guard interval from a received COFDM symbol, before the data is recovered from the COFDM symbol using a Fast Fourier Transform (FFT) processor 308 in combination with a channel estimator and correction processor 310 in co-operation with a embedded-signalling decoding unit 311, in accordance with known techniques. The demodulated data is recovered from a mapper 312 and fed to a symbol de-interleaver 314, which operates to effect the reverse mapping of the received data symbol to re-generate an output data stream with the data de-interleaved.

Figure 8:
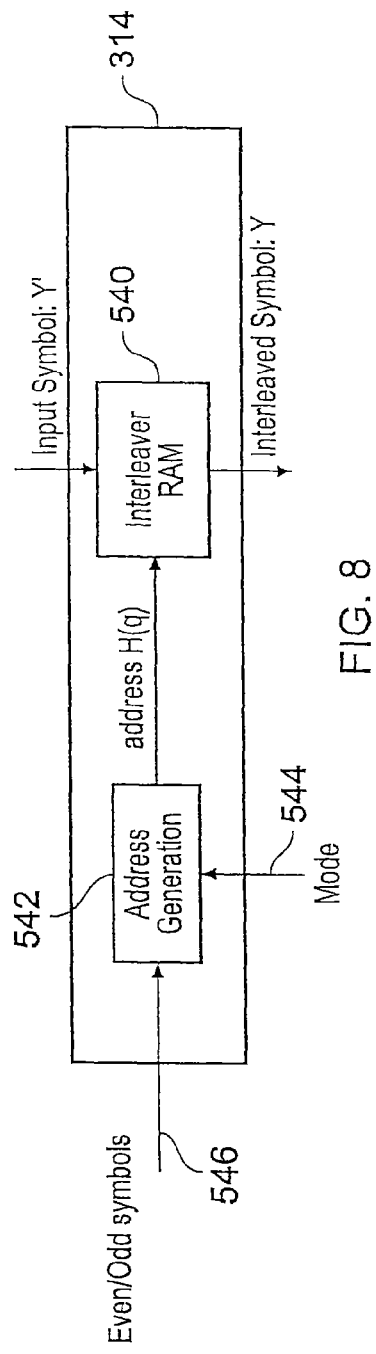
FIG. 8 is a schematic block diagram of a symbol de-interleaver which appears in FIG. 7.

The symbol de-interleaver 314 is formed from a data processing apparatus as shown in FIG. 7 with an interleaver memory 540 and an address generator 542. The interleaver memory is as shown in FIG. 4 and operates as already explained above to effect de-interleaving by utilising sets of addresses generated by the address generator 542. The address generator 542 is formed as shown in FIG. 8 and is arranged to generate corresponding addresses to map the data symbols recovered from each COFDM sub-carrier signals into an output data stream.

The remaining parts of the COFDM receiver shown in FIG. 7 are provided to effect error correction decoding 318 to correct errors and recover an estimate of the source data.

One advantage provided by the present technique for both the receiver and the transmitter is that a symbol interleaver and a symbol de-interleaver operating in the receivers and transmitters can be switched between the 1 k, 2 k, 4 k, 8 k, 16 k and the 32 k mode by changing the generator polynomials and the permutation order. Hence the address generator 542 shown in FIG. 8 includes an input 544, providing an indication of the mode as well as an input 546 indicating whether there are odd/even COFDM symbols. A flexible implementation is thereby provided because a symbol interleaver and de-interleaver can be formed as shown in FIGS. 3 and 8, with an address generator as illustrated in FIG. 5. The address generator can therefore be adapted to the different modes by changing to the generator polynomials and the permutation orders indicated for each of the modes. For example, this can be effected using a software change. Alternatively, in other embodiments, an embedded signal indicating the mode of the DVB-T2 transmission can be detected in the receiver in the embedded-signalling processing unit 311 and used to configure automatically the symbol de-interleaver in accordance with the detected mode.

Alternatively, as mentioned above, different interleavers can be used with different modes, by simply adapting the maximum valid address in accordance with the mode being used.

Optimal Use of Odd Interleavers

As shown in FIG. 4, two symbol interleaving processes, one for even COFDM symbols and one for odd COFDM symbols allows the amount of memory used during interleaving to be reduced. In the example shown in FIG. 4, the write in order for the odd symbol is the same as the read out order for the even symbol therefore, while an odd symbol is being read from the memory, an even symbol can be written to the location just read from; subsequently, when that even symbol is read from the memory, the following odd symbol can be written to the location just read from.

Figure 6A:
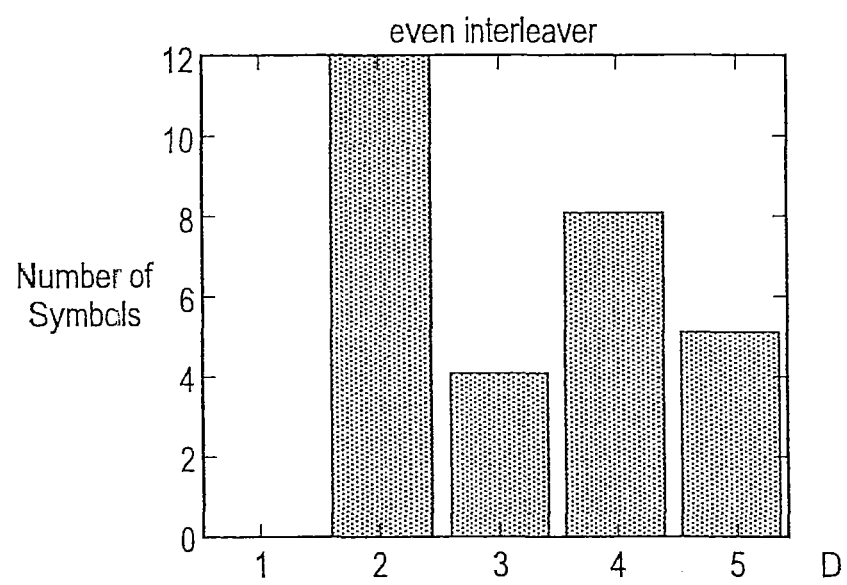
Figure 6B:
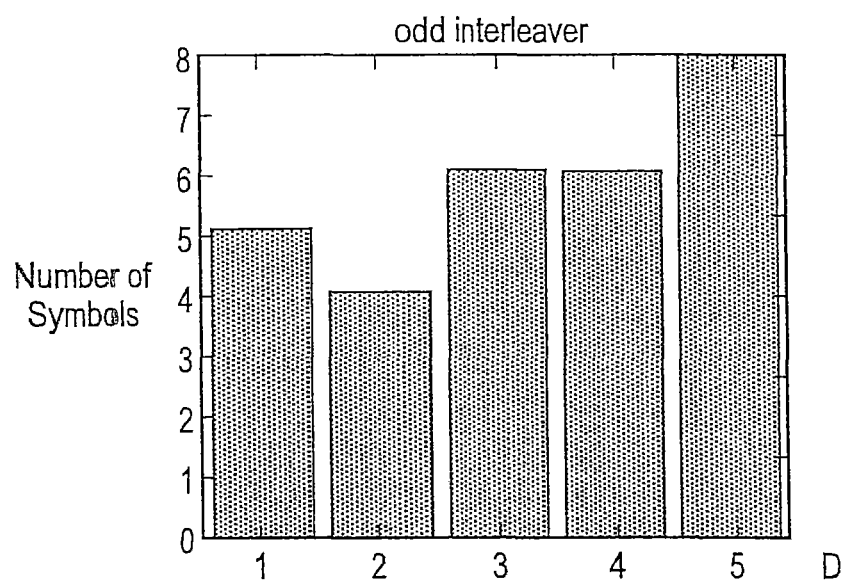
Figure 6C:
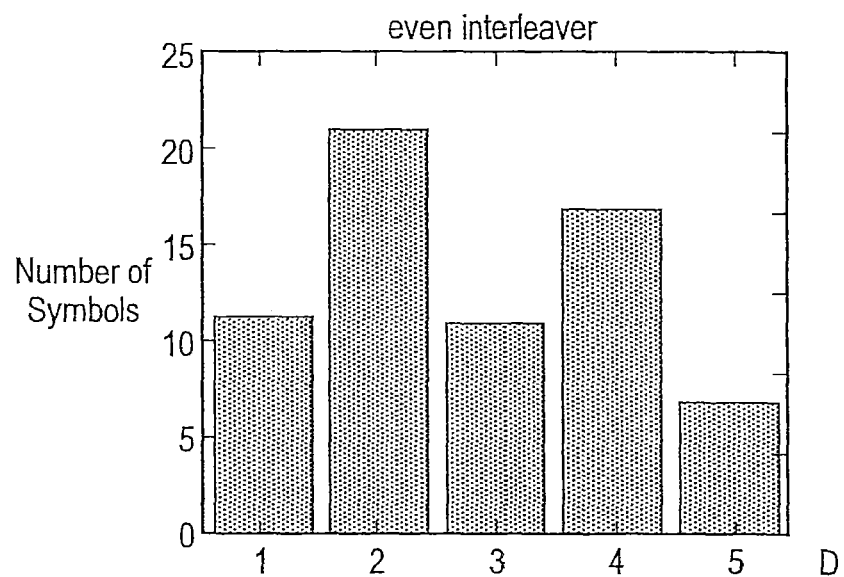
FIG. 6(c) is a diagram illustrating comparative results for an address generator using a different permutation code for even OFDM symbols and FIG. 6(d) is a corresponding diagram for odd OFDM symbols.
Figure 6D:
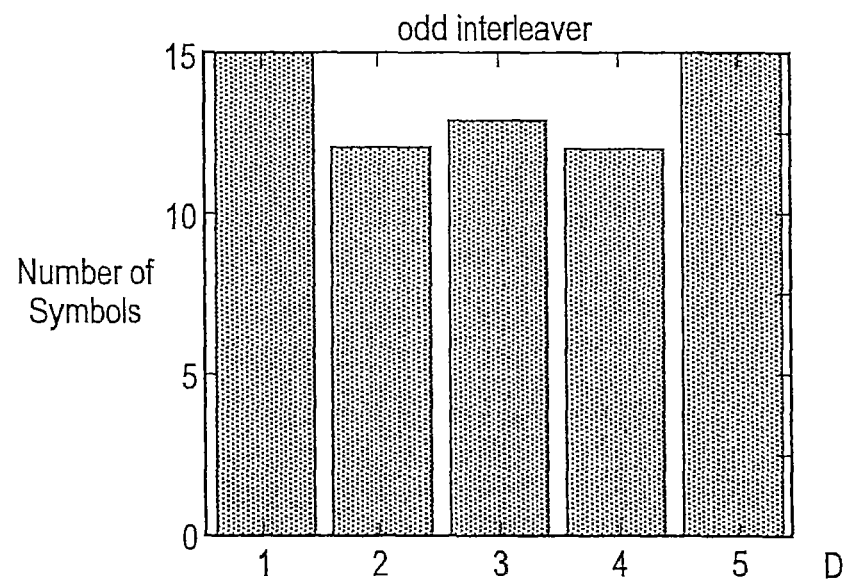
Figure 9A:
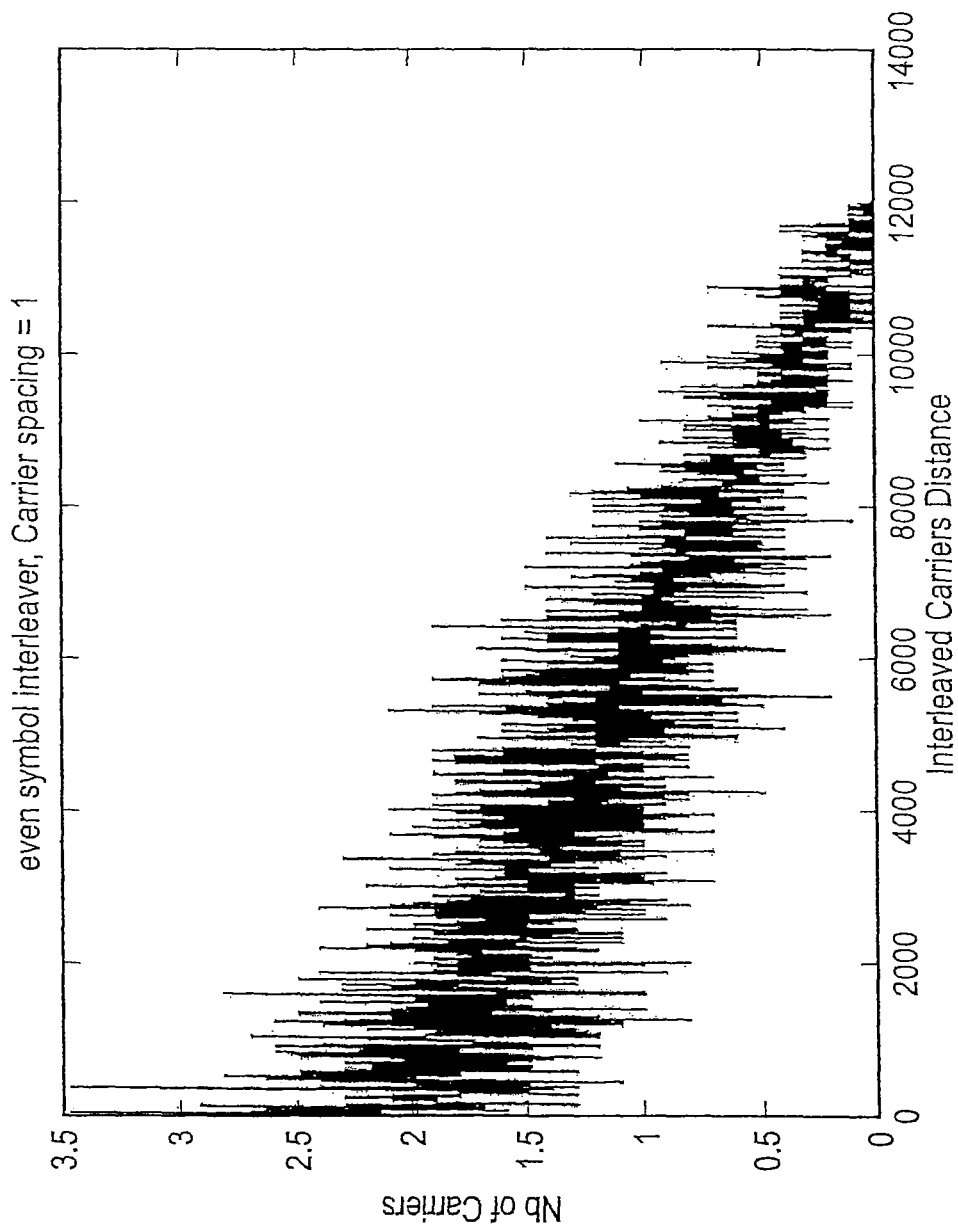
FIG. 9(a) is diagram illustrating results for an interleaver using the address generator shown in FIG. 5 for even OFDM symbols and FIG. 9(b) is a diagram illustrating results for odd OFDM symbols.
Figure 9B:
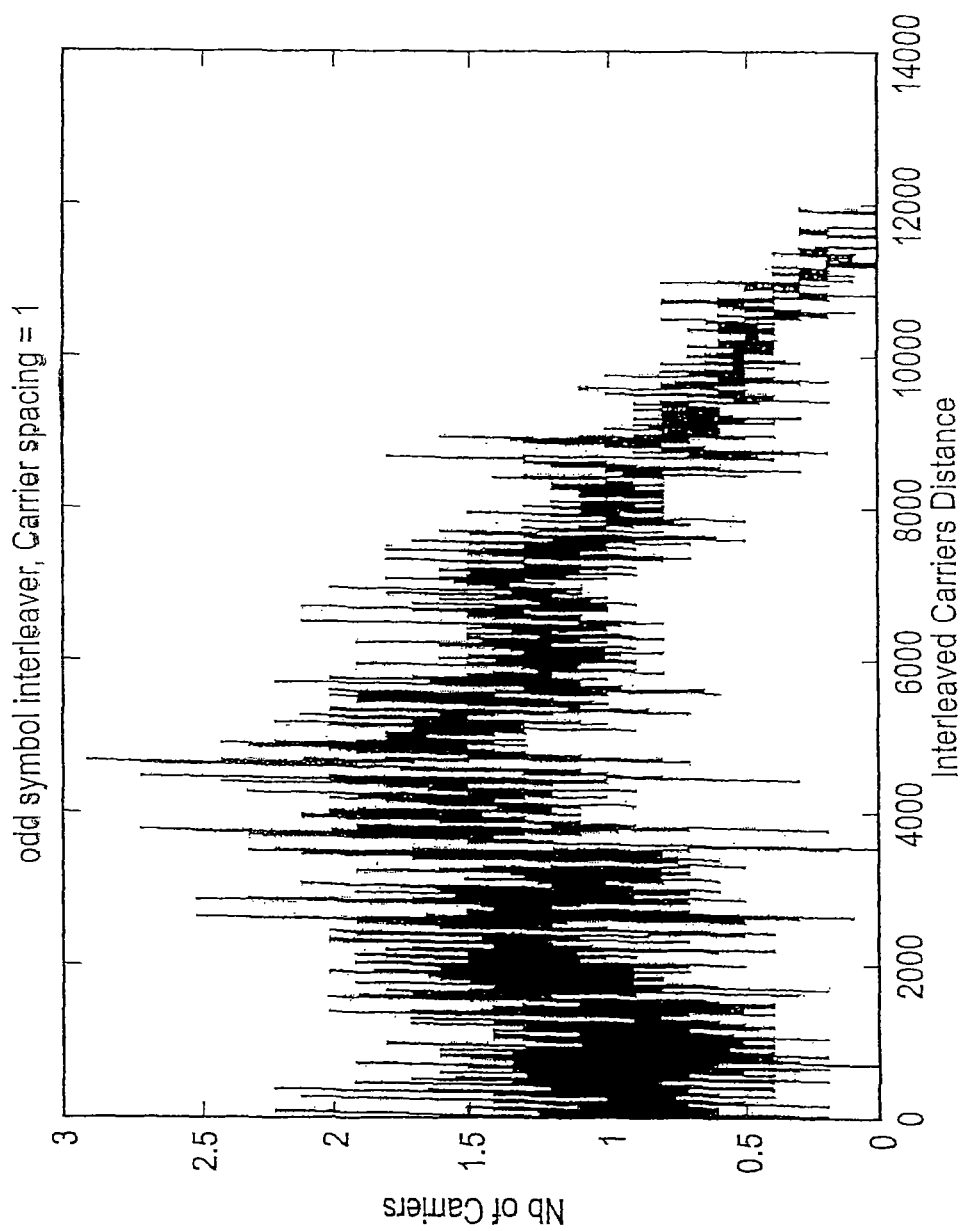

As mentioned above, during an experimental analysis of the performance of the interleavers (using criterion C as defined above) and for example shown in FIG. 9(a) and FIG. 9(b) it has been discovered that the interleaving schemes designed for the 2 k and 8 k symbol interleavers for DVB-T and the 4 k symbol interleaver for DVB-H work better for odd symbols than even symbols. Thus from performance evaluation results of the interleavers, for example, as illustrated by FIGS. 9(a) and 9(b) have revealed that the odd interleavers work better than the even interleavers. This can be seen by comparing FIG. 9(a) which shows results for an interleaver for even symbols and FIG. 6(b) illustrating results for odd symbols: it can be seen that the average distance at the interleaver output of sub-carriers that were adjacent at the interleaver input is greater for an interleaver for odd symbols than an interleaver for even symbols.

As will be understood, the amount of interleaver memory required to implement a symbol interleaver is dependent on the number of data symbols to be mapped onto the COFDM carrier symbols. Thus a 16 k mode symbol interleaver requires half the memory required to implement a 32 k mode symbol interleaver and similarly, the amount of memory required to implement an 8 k symbol interleaver is half that required to implement a 16 k interleaver. Therefore a transmitter or receiver which is arranged to implement a symbol interleaver of a mode, which sets the maximum number of data symbols which can be carried per OFDM symbol, then that receiver or transmitter will include sufficient memory to implement two odd interleaving processes for any other mode, which provides half or smaller than half the number of sub-carriers per OFDM symbol in that given maximum mode. For example a receiver or transmitter including a 32 k interleaver will have enough memory to accommodate two 16 k odd interleaving processes each with their own 16 k memory.

Therefore, in order to exploit the better performance of the odd interleaving processes, a symbol interleaver capable of accommodating multiple modulation modes can be arranged so that only an odd symbol interleaving process is used if in a mode which comprises half or less than half of the number of sub-carriers in a maximum mode, which represents the maximum number of sub-carriers per OFDM symbol. This maximum mode therefore sets the maximum memory size. For example, in a transmitter/receiver capable of the 32 k mode, when operating in a mode with fewer carriers (i.e. 16 k, 8 k, 4 k or 1 k) then rather than employing separate odd and even symbol interleaving processes, two odd interleavers would be used.

Figure 10:
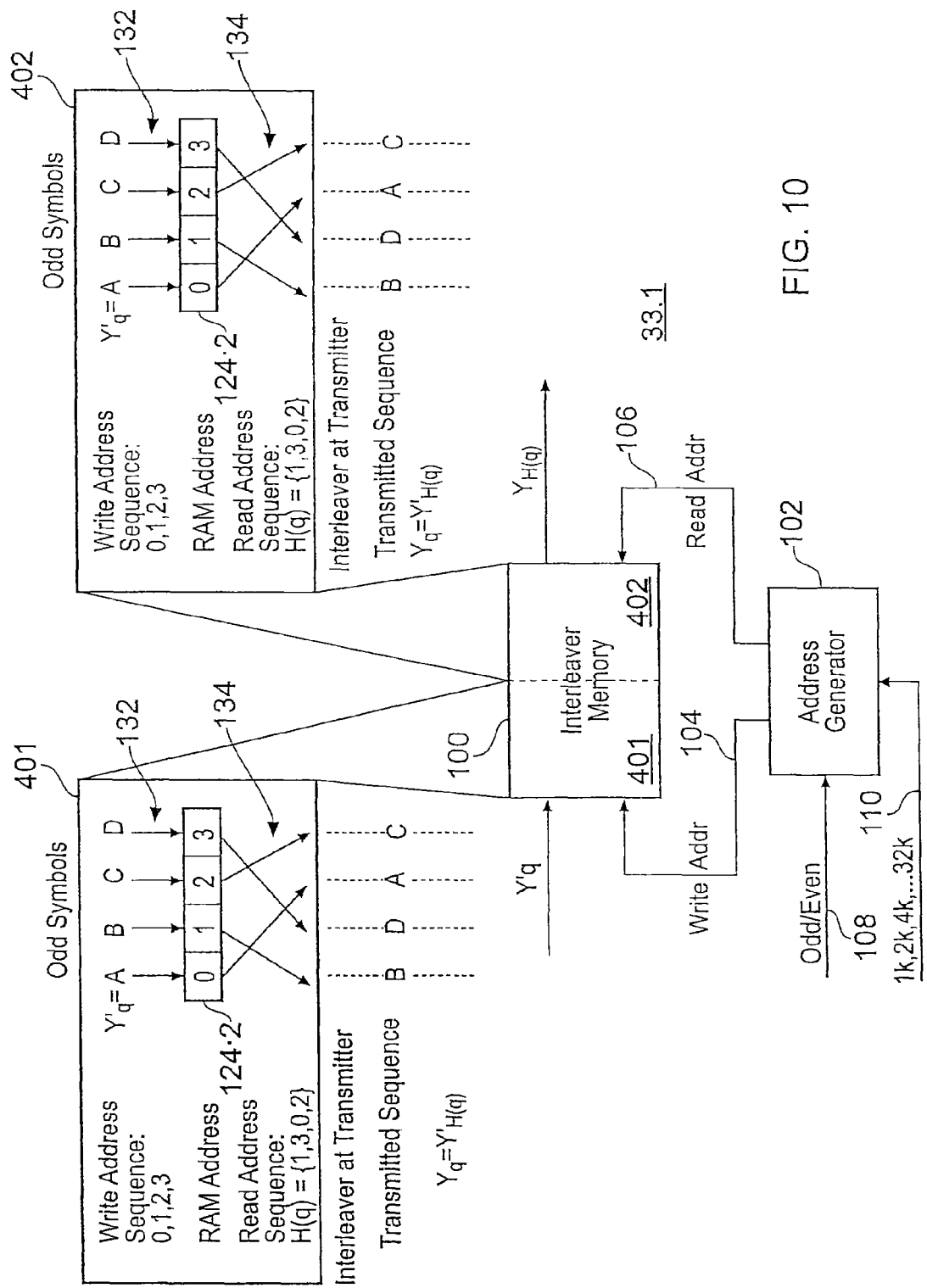
FIG. 10 provides a schematic block diagram of the symbol interleaver shown in FIG. 3, illustrating an operating mode in which interleaving is performed in accordance with an odd interleaving mode only.

An illustration of an adaptation of the symbol interleaver 33 which is shown in FIG. 3 when interleaving input data symbols onto the sub-carriers of OFDM symbols in the odd interleaving mode only is shown in FIG. 10. The symbol interleaver 33.1 corresponds exactly to the symbol interleaver 33 as shown in FIG. 3, except that the address generator 102.1 is adapted to perform the odd interleaving process only. For the example shown in FIG. 10, the symbol interleaver 33.1 is operating in a mode where the number of data symbols which can be carried per OFDM symbol is less than half of the maximum number which can be carried by an OFDM symbol in an operating mode with the largest number of sub-carriers per OFDM symbol. As such, the symbol interleaver 33.1 has been arranged to partition the interleaver memory 100. For the present illustration shown in FIG. 10 the interleaver memory then 100 is divided into two parts 401, 402. As an illustration of the symbol interleaver 33.1 operating in a mode in which data symbols are mapped onto the OFDM symbols using the odd interleaving process, FIG. 10 provides an expanded view of each half of the interleaver memory 401, 402. The expanded provides an illustration of the odd interleaving mode as represented for the transmitter side for four symbols A, B, C, D reproduced from FIG. 4. Thus as shown in FIG. 10, for successive sets of first and second data symbols, the data symbols are written into the interleaver memory 401, 402 in a sequential order and read out in accordance with addresses generated by the address generator 102 in a permuted order in accordance with the addresses generated by the address generator as previously explained. Thus as illustrated in FIG. 10, since an odd interleaving process is being performed for successive sets of first and second sets of data symbols, the interleaver memory must be partitioned into two parts. Symbols from a first set of data symbols are written into a first half of the interleaver memory 401, and symbols from a second set of data symbols are written into a second part of the interleaver memory 402, because the symbol interleaver is no longer able to reuse the same parts of the symbol interleaver memory as can be accommodated when operating in an odd and even mode of interleaving.

Figure 11:
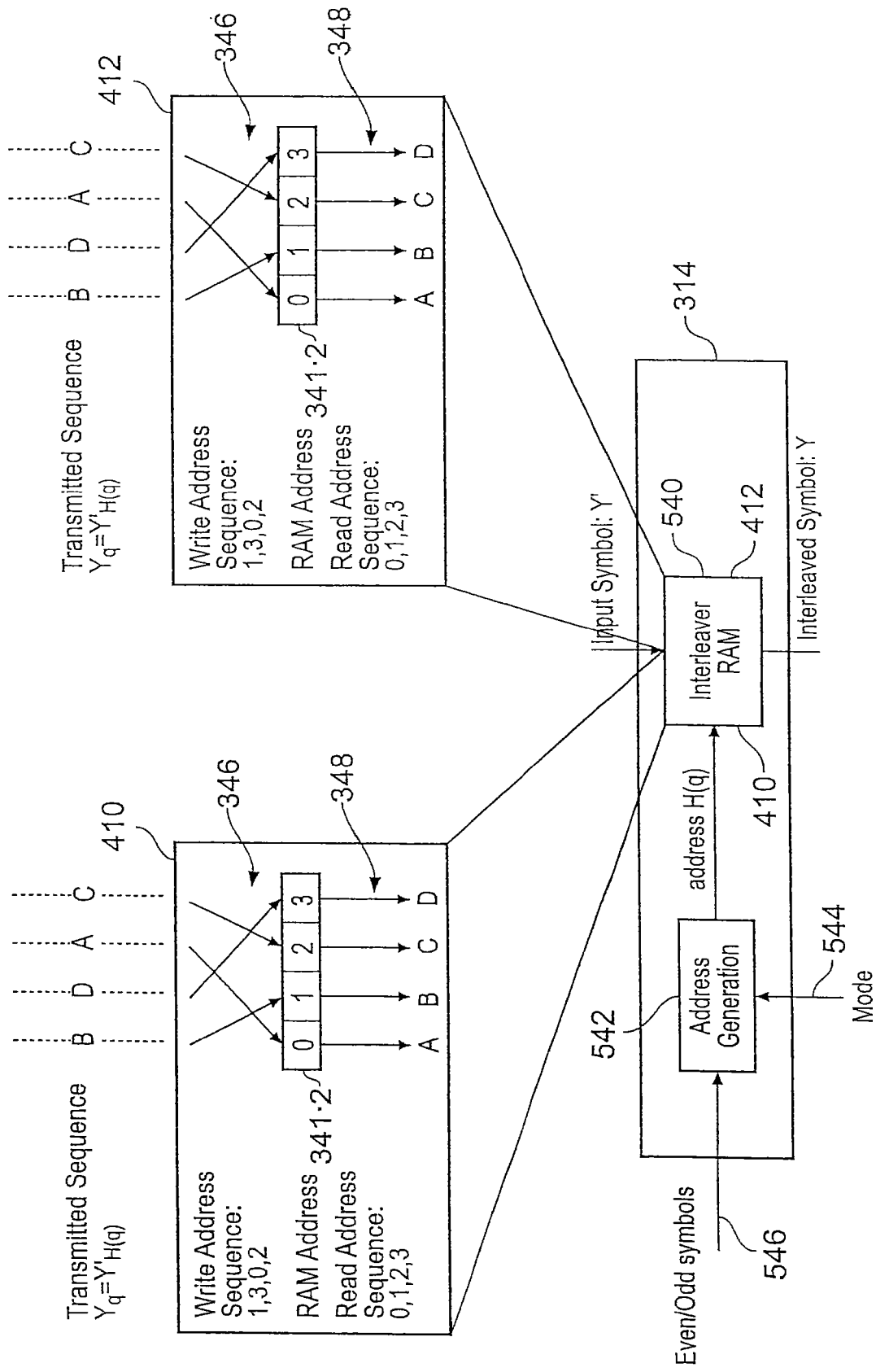
FIG. 11 provides a schematic block diagram of the symbol de-interleaver shown in FIG. 8, illustrating the operating mode in which interleaving is performed in accordance with the odd interleaving mode only.

A corresponding example of the interleaver in the receiver, which appears in FIG. 8 but adapted to operate with an odd interleaving process only is shown in FIG. 11. As shown in FIG. 11 the interleaver memory 340 is divided into two halves 410, 412 and the address generator 542 is adapted to write data symbols into the interleaver memory and read data symbols from the interleaver memory into respective parts of the memory 410, 402 for successive sets of data symbols to implement an odd interleaving process only. Therefore, in correspondence with representation shown in FIG. 10, FIG. 11 shows the mapping of the interleaving process which is performed at the receiver and illustrated in FIG. 4 as an expanded view operating for both the first and second halves of the interleaving memory 410, 412. Thus a first set of data symbols are written into a first part of the interleaver memory 410 in a permuted order defined in accordance with the addresses generated by the address generator 542 as illustrated by the order of writing in the data symbols which provides a write sequence of 1, 3, 0, 2. As illustrated the data symbols are then read out of the first part of the interleaver memory 410 in a sequential order thus recovering the original sequence A, B, C, D.

Correspondingly, a second subsequent set of data symbols which are recovered from a successive OFDM symbol are written into the second half of the interleaver memory 412 in accordance with the addresses generated by the address generator 542 in a permuted order and read out into the output data stream in a sequential order.

In one example the addresses generated for a first set of data symbols to write into the first half of the interleaver memory 410 can be reused to write a second subsequent set of data symbols into the interleaver memory 412. Correspondingly, the transmitter may also reuse addresses generated for one half of the interleaver for a first set of data symbols for reading out a second set of data symbols which have been written into the second half of the memory in sequential order.
Using a Sequence of Permutations In one example the address generator can apply a different permutation code from a set of permutation codes for successive OFDM symbols. Using a sequence of permutations in the interleaver address generator reduces a likelihood that any bit of data input to the interleaver does not always modulate the same sub-carrier in the OFDM symbol. In another example, two address generators could be used, one generating addresses for the first set of data symbols and the first half of the memory and the other generating a different sequence of addresses for the second set of data symbols and the second half of the memory. The two address generators might differ in their choice of permutation code from the table of good permutations above for example.

For example, a cyclic sequence could be used, so that a different permutation code in a set of permutation codes in a sequence is used for successive OFDM symbols and then repeated. This cyclic sequence could be, for example, of length two or four. For the example of the 16 k symbol interleaver a sequence of two permutation codes which are cycled through per OFDM symbol could be for example:

8 4 3 2 0 11 1 5 12 10 6 7 9
7 9 5 3 11 1 14 0 2 12 10 8 6 whereas a sequence of four permutation codes could be:

8 4 3 2 0 11 1 5 12 10 6 7 9
7 9 5 3 11 1 14 0 2 12 10 8 6
6 11 7 5 2 3 0 1 10 8 12 9 4
5 12 9 0 3 10 2 4 6 7 8 11 1

The switching of one permutation code to another could be effected in response to a change in the Odd/Even signal indicated on the control channel 108. In response the control unit 224 changes the permutation code in the permutation code circuit 210 via the control line 111.

For the example of a 1 k symbol interleaver, two permutation codes could be:

4 3 2 1 0 5 6 7 8
3 2 5 0 1 4 7 8 6 whereas four permutation codes could be:

4 3 2 1 0 5 6 7 8
3 2 5 0 1 4 7 8 6
7 5 3 8 2 6 1 4 0
1 6 8 2 5 3 4 0 7

Other combinations of sequences may be possible for 2 k, 4 k and 8 k carrier modes or indeed 0.5 k carrier mode. For example, the following permutation codes for each of the 0.5 k, 2 k, 4 k and 8 k provide good de-correlation of symbols and can be used cyclically to generate the offset to the address generated by an address generator for each of the respective modes:

| 2k Mode: |
| --- |
| 0 7 5 1 8 2 6 9 3 4 * |
| 4 8 3 2 9 0 1 5 6 7 |
| 8 3 9 0 2 1 5 7 4 6 |
| 7 0 4 8 3 6 9 1 5 2 |
| 4k Mode: |
| 7 10 5 8 1 2 4 9 0 3 6 ** |
| 6 2 7 10 8 0 3 4 1 9 5 |
| 9 5 4 2 3 10 1 0 6 8 7 |
| 1 4 10 3 9 7 2 6 5 0 8 |
| 8k Mode: |
| 5 11 3 0 10 8 6 9 2 4 1 7 * |
| 10 8 5 4 2 9 1 0 6 7 3 11 |
| 11 6 9 8 4 7 2 1 0 10 5 3 |
| 8 3 11 7 9 1 5 6 4 0 2 10 |

For the permutation codes indicated above, the first two could be used in a two sequence cycle, whereas all four could be used for a four sequence cycle. In addition, some further sequences of four permutation codes, which are cycled through to provide the offset in an address generator to produce a good de-correlation in the interleaved symbols (some are common to the above) are provided below:

| 0.5k Mode: |
| --- |
| 3 7 4 6 1 2 0 5 |
| 4 2 5 7 3 0 1 6 |
| 5 3 6 0 4 1 2 7 |
| 6 1 0 5 2 7 4 3 |
| 2k Mode: |
| 0 7 5 1 8 2 6 9 3 4* |
| 3 2 7 0 1 5 8 4 9 6 |
| 4 8 3 2 9 0 1 5 6 7 |
| 7 3 9 5 2 1 0 6 4 8 |
| 4k Mode: |
| 7 10 5 8 1 2 4 9 0 3 6** |
| 6 2 7 10 8 0 3 4 1 9 5 |
| 10 3 4 1 2 7 0 6 8 5 9 |
| 0 8 9 5 10 4 6 3 2 1 7 |
| 8k Mode: |
| 5 11 3 0 10 8 6 9 2 4 1 7* |
| 8 10 7 6 0 5 2 1 3 9 4 11 |
| 11 3 6 9 2 7 4 10 5 1 0 8 |
| 10 8 1 7 5 6 0 11 4 2 9 3 |

*these are the permutations in the DVB-T standard
**these are the permutations in the DVB-H standard Examples of address generators, and corresponding interleavers, for the 2 k, 4 k and 8 k modes are disclosed in European patent application number 04251667.4, the contents of which are incorporated herein be reference. An address generator for the 0.5 k mode are disclosed in our co-pending UK patent application number 0722553.5.

Various further aspects in features of the present invention are defined in the independent claims. Various modifications may be made to the embodiments described above without departing from the scope of the present invention. In particular, the example representation of the generator polynomial and the permutation order which have been used to represent aspects of the invention are not intended to be limiting and extend to equivalent forms of the generator polynomial and the permutation order.

As will be appreciated the transmitter and receiver shown in FIGS. 1 and 7 respectively are provided as illustrations only and are not intended to be limiting. For example, it will be appreciated that the position of the symbol interleaver and the de-interleaver with respect, for example to the bit interleaver and the mapper and de-mapper can be changed. As will be appreciated the effect of the interleaver and de-interleaver is un-changed by its relative position, although the interleaver may be interleaving I/Q symbols instead of v-bit vectors. A corresponding change may be made in the receiver. Accordingly, the interleaver and de-interleaver may be operating on different data types, and may be positioned differently to the position described in the example embodiments.

As explained above the permutation codes and generator polynomial of the interleaver, which has been described with reference to an implementation of a particular mode, can equally be applied to other modes, by changing the predetermined maximum allowed address in accordance with the number of carriers for that mode.

According to one implementation of a receiver there is included a data processing apparatus operable to map data symbols received from a predetermined number of sub-carrier signals of Orthogonal Frequency Division Multiplexed OFDM symbols into an output data stream, the predetermined number of sub-carrier signals being determined in accordance with one of a plurality of operating modes and the data symbols being divided into first sets of data symbols and second sets of data symbols. The data processing apparatus comprises an interleaver operable to perform an odd interleaving process which interleaves the first sets of data symbols from the sub-carrier signals of first OFDM symbols into an output data stream and an even interleaving process which interleaves the second sets of data symbols from the sub-carrier signals of second OFDM symbols into the output data streams. The odd interleaving process includes writing the first sets of data symbols recovered from the sub-carrier signals of the first OFDM symbols into an interleaver memory in accordance with an order defined by a permutation code, and reading out the first sets of data symbols from the interleaver memory in a accordance with a sequential order into the output data stream. The even interleaving process includes writing the second sets of data symbols recovered from the sub-carrier signals of the second OFDM symbols into the interleaver memory in accordance with a sequential order, and reading out the second sets of data symbols from the interleaver memory in accordance with an order defined by the permutation code into the output data stream, such that while data symbols from the first set are being read from locations in the interleaver memory, data symbols from the second set can be written to the locations just read from and when data symbols from the second set are being read from the locations in the interleaver memory, the data symbols from a following first set can be written to the locations just read from. When the modulation mode is a mode which includes half or less than half a number of sub-carrier signals than a total number of sub-carriers in the OFDM symbols for carrying the data symbols that can be accommodated by the interleaver memory, the data processing apparatus is operable to interleave the data symbols from both the first and second sets in accordance with the odd interleaving process from the first and second OFDM symbols.

As mentioned above, embodiments of the present invention find application with DVB standards such as DVB-T, DVB-T2 and DVB-H, which are incorporated herein by reference. For example, embodiments of the present invention may be used in a transmitter or receiver operating in accordance with the DVB-T2 standard as specified in accordance with ETSI standard EN 302 755, although it will be appreciated that the present invention is not limited to application with DVB and may be extended to other standards for transmission or reception, both fixed and mobile. In other examples embodiments of the present invention find application with the cable transmission standard known as DVB-C2.

In addition to the example embodiments described above and the aspects and features of the invention defined in the appended claims, other embodiments can provide a data processing apparatus operable to map input symbols to be communicated onto a predetermined number of sub-carrier signals of an Orthogonal Frequency Division Multiplexed (OFDM) symbol. The predetermined number of sub-carrier signals corresponds to a modulation mode and the input symbols include odd data symbols and even data symbols. The data processing apparatus comprises an interleaver operable to perform a first interleaving process which interleaves odd input data symbols on to the sub-carrier signals and an even interleaving process which interleaves even input data symbols on to the sub-carrier signals, the first odd interleaving process and even interleaving process which reads-in and reads out the data symbols for mapping onto the OFDM sub-carrier signals to an interleaver memory the read-out being in a different order than the read-in such that while an odd symbol is being read from a location in the memory, an even symbol can be written to the location just read from and when an even symbol is read from the location in the memory, a following odd symbol can be written to the location just read from, the odd interleaving process reading-in and reading-out odd data symbols from the interleaver memory in accordance with an odd interleaving scheme and the even interleaving process reading-in and reading-out even data symbols from the interleaver memory in accordance with an even interleaving scheme. When the modulation mode is a mode which includes half or less than half sub-carrier signals than a total number of sub-carriers that can be accommodated by the interleaver memory, the data apparatus is operable to assign a portion of the interleaving memory to the first odd interleaving process and assign a second portion of the interleaving memory to a second odd interleaving process operating in accordance with the first, the second odd interleaving process interleaving the even input symbols.

According to another example embodiment a data processing apparatus is operable to map input symbols to be communicated onto a predetermined number of sub-carrier signals of an Orthogonal Frequency Division Multiplexed (OFDM) symbol. The predetermined number of sub-carrier signals corresponds to a modulation mode and the input symbols include first data symbols for mapping onto a first OFDM symbol and second data symbols for mapping onto a second OFDM symbol. The data processing apparatus comprises an interleaver operable to perform an odd interleaving process which interleaves first input data symbols on to the sub-carrier signals and an even interleaving process which interleaves second input data symbols on to the sub-carrier signals, the odd interleaving process writing the first input data symbols into an interleaver memory in accordance with a sequential order of the first input data symbols and reading out the first data symbols from the interleaver memory on to the sub-carrier signals in a accordance with an order defined by a permutation code, the even interleaving process writing the second input data symbols into an interleaver memory in a accordance with an order defined by the permutation code and reading out the second data symbols from the interleaver memory on to the sub-carrier signals in accordance with a sequential order such that while a first input data symbol is being read from a location in the interleaver memory, a second symbol can be written to the location just read from and when a second symbol is read from the location in the interleaver memory, a following first symbol can be written to the location just read from. When the modulation mode is a mode which includes half or less than half a number of sub-carrier signals than a total number of sub-carriers that can be accommodated by the interleaver memory, the data apparatus is operable to interleave both first and second input symbols in accordance with the odd interleaving process.

Another example embodiment can provide a method of mapping input symbols to be communicated onto a predetermined number of sub-carrier signals of an Orthogonal Frequency Division Multiplexed (OFDM) symbol. The method comprises mapping first data symbols onto a first OFDM symbol and mapping second data symbols onto a second OFDM symbol. The mapping is performed in accordance with an odd interleaving process which interleaves first input data symbols on to the sub-carrier signals and an even interleaving process which interleaves second input data symbols on to the sub-carrier signals, the odd interleaving process writing the first input data symbols into an interleaver memory in accordance with a sequential order of the first input data symbols and reading out the first data symbols from the interleaver memory on to the sub-carrier signals in a accordance with an order defined by a permutation code, the even interleaving process writing the second input data symbols into an interleaver memory in a accordance with an order defined by the permutation code and reading out the second data symbols from the interleaver memory on to the sub-carrier signals in accordance with a sequential order such that while a first input data symbol is being read from a location in the interleaver memory, a second symbol can be written to the location just read from and when a second symbol is read from the location in the interleaver memory, a following first symbol can be written to the location just read from, and when the modulation mode is a mode which includes half or less than half a number of sub-carrier signals than a total number of sub-carriers that can be accommodated by the interleaver memory, both first and second input symbols are interleaved in accordance with the odd interleaving process.

The invention claimed is:

1. A data processing apparatus configured to map input data symbols to be communicated onto a predetermined number of sub-carrier signals of Orthogonal Frequency Division Multiplexed (OFDM) symbols, wherein
the predetermined number of sub-carrier signals are determined in accordance with one of a plurality of operating modes and the input data symbols including first sets of input data symbols and second sets of input data symbols, the data processing apparatus comprising:
modulator circuitry configured to embed data indicating the one of a plurality operating modes,
an interleaver configured to perform an odd interleaving process which interleaves the first sets of input data symbols on to the sub-carrier signals of first OFDM symbols and an even interleaving process which interleaves the second sets of input data symbols on to the sub-carrier signals of second OFDM symbols, and
an interleaver memory,
the odd interleaving process comprising:
writing the first sets of input data symbols into the interleaver memory in accordance with a sequential order of the first sets of input data symbols, and reading out the first sets of data symbols from the interleaver memory on to the sub-carrier signals of the first OFDM symbols in a accordance with an order defined by a permutation code, the even interleaving process comprising:

writing the second sets of input data symbols into the interleaver memory in accordance with an order defined by the permutation code, and reading out the second sets of data symbols from the interleaver memory on to the sub-carrier signals of the second OFDM symbols in accordance with a sequential order such that while input data symbols from the first set are being read from locations in the interleaver memory, input data symbols from the second set can be written to the locations just read from and when input data symbols from the second set are being read from the locations in the interleaver memory, the input data symbols from a following first set can be written to the locations just read from, wherein when the number data symbols which can be carried by the sub-carriers of an OFDM symbol in one of the plurality of operating modes is half or less than half of the number of data symbols, which can be carried in an operating mode which provides the most number of data bearing sub-carrier signals per OFDM symbol, the data processing apparatus is configured to interleave the input data symbols from both first and second sets in accordance with the odd interleaving process on to the first and second OFDM symbols, and the data processing apparatus is further configured to change the permutation code according to the one of a plurality of operating modes corresponding to the data embedded by said modulator circuitry.

2. The data processing apparatus of claim 1, wherein the interleaver is configured to further change the permutation code that is used to form the addresses from one OFDM symbol to another for an operating mode that provides half or less than half of the number of data bearing sub-carrier signals than the operating mode that provides the most number of data bearing sub carrier signals per OFDM symbols.

3. The data processing apparatus as claimed in claim 1, wherein the interleaver includes a controller, an address generator, and the interleaver memory, the controller being configured to control the address generator to generate the addresses during the odd interleaving process for reading out the first sets of data symbols from the interleaver memory on to the sub-carrier signals of the first or first and second OFDM symbol in accordance with an order defined by the permutation code, and during the even interleaving process for writing the second input data symbols into the interleaver memory in accordance with the order defined by the permutation code.

4. The data processing apparatus as claimed in claim 1, comprising an address generator which comprises:

a linear feedback shift register including a predetermined number of register stages and configured to generate a pseudo-random bit sequence in accordance with a generator polynomial, a permutation circuit configured to receive the content of the shift register stages and to permute the bits present in the register stages in accordance with the permutation code to form the addresses of one of the OFDM carriers, and a control unit configured in combination with an address check circuit to re-generate an address when a generated address exceeds a predetermined maximum valid address, the predetermined maximum valid address being set in accordance with the operating mode.

5. The data processing apparatus as claimed in claim 1, wherein a minimum size of the interleaver memory can be provided in accordance with the most number of input data symbols that can be carried on the sub-carriers of the OFDM symbols which are available to carry the input data symbols in any of the operating modes.

6. The data processing apparatus as claimed in claim 1, wherein when operating in the operating mode that provides the most number of sub-carriers per OFDM symbol, the interleaver is configured to use the available interleaver memory in accordance with the odd interleaving process and the even interleaving process to the effect of reading input data symbols from locations in the interleaver memory and writing input data symbols to the locations just read from, and when operating in any other mode in which the number of sub-carriers is a half or less than a half the number of sub-carriers for carrying the input data symbols per OFDM symbol, the interleaver is configured in the odd interleaving process to read input data symbols from first locations in the interleaver memory and writing input data symbols into the interleaver memory at second locations, the second locations being different from the first locations.

7. A transmitter for transmitting data using Orthogonal Frequency Division Multiplexing (OFDM), the transmitter including a data processing apparatus according to claim 1.

8. The data processing apparatus as claimed in claim 5, wherein the operating mode which provides the most number of sub-carriers per OFDM symbol is a 32 k mode.

9. The data processing apparatus as claimed in claim 5, wherein the other modes providing less than the most number of sub-carriers per OFDM symbol include one or more of 0.5 k, 1 k, 2 k, 4 k, 8 k, and 16 k modes.

10. A method of mapping input data symbols to be communicated onto a predetermined number of sub-carrier signals of Orthogonal Frequency Division Multiplexed (OFDM) symbols, the predetermined number of sub-carrier signals being determined in accordance with one of a plurality of operating modes and the input data symbols including first sets of input data symbols and second sets of input data symbols, the method comprising:

embedding by circuitry an indication of the one of a plurality of operating modes, interleaving, in accordance with an odd interleaving process which interleaves the first sets of input data symbols on to the sub-carrier signals of first OFDM symbols and in accordance with an even interleaving process which interleaves the second sets of input data symbols on to the sub-carrier signals of second OFDM symbols, the odd interleaving process comprising:

writing the first sets of input data symbols into an interleaver memory in accordance with a sequential order of the first sets of input data symbols, and reading out the first sets of data symbols from the interleaver memory on to the sub-carrier signals of the first OFDM symbols in accordance with an order defined by a permutation code, and the even interleaving process comprising:

writing the second sets of input data symbols into the interleaver memory in accordance with an order defined by the permutation code, and reading out the second sets of input data symbols from the interleaver memory on to the sub-carrier signals of the second OFDM symbols in accordance with a sequential order, wherein the interleaving is arranged such that while input data symbols from the first set are being read from locations in the interleaver memory, input data symbols from the second set can be written to the locations just read from and when input data symbols from the second set are being read from the locations in the interleaver memory, the input data symbols from a following first set can be written to the locations just read from, and when the number data symbols which can be carried by the sub-carriers of an OFDM symbol in one of the plurality of operating modes is half or less than half of the number of data symbols, which can be carried in an operating mode which provides the most number of data bearing sub-carrier signals per OFDM symbol, the method comprises interleaving the input data symbols from both first and second sets in accordance with the odd interleaving process on to the first and the second OFDM symbols and changing the permutation code according to the one of a plurality of operating modes for which the indication is embedded.

11. The method of claim 10, wherein the interleaving comprises further changing the permutation code which is used to form the addresses from one OFDM symbol to another for an operating mode which provides half or less than half of the number of data bearing sub carrier signals that the operating mode which provides the most number of data bearing sub carrier signals per OFDM symbol.

12. The method as claimed in claim 10, wherein the interleaving comprises:
generating addresses using an address generator during the odd interleaving process for reading out the first or first and second sets of input data symbols from the interleaver memory on to the sub-carrier signals of the first OFDM symbol in accordance with the order defined by the permutation code, and
using the generated addresses during the even interleaving process for writing the second input data symbols into the interleaver memory in accordance with the order defined by the permutation code.

13. The method as claimed in claim 10, wherein a minimum size of the interleaver memory can be provided in accordance with the most number of input data symbols which can be carried on the sub-carriers of the OFDM symbols which are available to carry the input data symbols in any of the operating modes.

14. The method as claimed in claim 10, wherein
when operating in the operating mode which provides the most number of sub-carriers per OFDM symbol, the interleaving comprises using the available interleaver memory in accordance with the odd interleaving process and the even interleaving process to the effect of reading input data symbols from locations in the interleaver memory and writing input data symbols to the locations just read from, and when operating in any other mode in which the number of sub-carriers is a half or less than a half the number of sub-carriers for carrying the input data symbols per OFDM symbol, the odd interleaving comprises:

reading the first sets of input data symbols from first locations in the interleaver memory and writing the second sets of input data symbols into the interleaver memory at second locations, the second locations being different from the first locations.

15. The method as claimed in claim 10, wherein the operating mode which provides the most number of sub-carriers per OFDM symbol is a 32 k mode.

16. The method as claimed in claim 10, wherein the other modes providing less than the most number of sub-carriers per OFDM symbol include at least one of 0.5 k, 1 k, 2 k, 4 k, 8 k, and 16 k modes.

17. The method as claimed in claim 12, wherein the generating the addresses using an address generator comprises:
generating a pseudo-random bit sequence using a linear feedback shift register including a predetermined number of register stages and a generator polynomial,
receiving the content of the shift register stages,
permuting the bits present in the shift register stages in accordance with the permutation code to form the addresses of one of the OFDM sub-carriers, and
re-generating an address when a generated address exceeds a predetermined maximum valid address, the predetermined maximum valid address being set in accordance with the operating mode.

* * * * *